(12) United States Patent
Ashkenazi et al.

(10) Patent No.: US 12,073,143 B2
(45) Date of Patent: *Aug. 27, 2024

(54) COLLABORATIVE REMOTE INTERACTIVE PLATFORM

(71) Applicant: Switchboard Visual Technologies, Inc., San Jose, CA (US)

(72) Inventors: Amir Ashkenazi, Los Altos, CA (US); Chris Jones, San Bruno, CA (US); Marco Iacono, San Francisco, CA (US); Daniel Shteremberg, San Francisco, CA (US)

(73) Assignee: Switchboard Visual Technologies, Inc., San Jose, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/532,305

(22) Filed: Dec. 7, 2023

(65) Prior Publication Data

US 2024/0118860 A1 Apr. 11, 2024

Related U.S. Application Data

(63) Continuation of application No. 18/201,292, filed on May 24, 2023, now Pat. No. 11,875,082, which is a
(Continued)

(51) Int. Cl.
*G06F 3/0482* (2013.01)
*G06F 3/0484* (2022.01)
(Continued)

(52) U.S. Cl.
CPC .......... *G06F 3/1454* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS 6,950,852 B1 9/2005 Kobayaghi et al.
8,245,141 B1 8/2012 Fuller et al.
(Continued)

OTHER PUBLICATIONS

App No. PCT/US2021/35594 International Search Report and Written Opinion of the International Searching Authority, Sep. 15, 2021.

*Primary Examiner* — Tuyetlien T Tran
(74) *Attorney, Agent, or Firm* — Weiss & Arons LLP

(57) ABSTRACT

Systems and methods for providing a remote interactive experience are provided. The systems and methods may include computer executable code stored in a non-transitory memory and run on a processor. The remote interactive experience may be provided via a digital platform. The platform may provide management of a shared browser. The shared browser may be shared by a plurality of participant devices. The platform may store the shared browser in a cloud-based location. The shared browser may thus be cloud-based. The platform may enable the plurality of participant devices to access the cloud-based shared browser. The platform may receive, as input, actions performed to each of the plurality of participant devices. The actions may include at least one of an action list that includes: a follow command (which instructs a participant device to replicate the remote interactive experience of a host device) a present command (which instructs a group of participant devices to replicate the remote interactive experience of a host device) a cursor movement, a window-sizing, a window-positioning, and a file navigation performed to the shared browser.

14 Claims, 21 Drawing Sheets

Related U.S. Application Data continuation of application No. 17/720,588, filed on Apr. 14, 2022, now Pat. No. 11,662,970, which is a continuation of application No. 17/567,315, filed on Jan. 3, 2022, now Pat. No. 11,314,474, which is a continuation of application No. 17/383,671, filed on Jul. 23, 2021, now Pat. No. 11,249,715, which is a continuation-in-part of application No. 17/337,624, filed on Jun. 3, 2021, now Pat. No. 11,190,557.

(60) Provisional application No. 63/128,321, filed on Dec. 21, 2020, provisional application No. 63/043,081, filed on Jun. 23, 2020.

(51) Int. Cl.
*G06F 3/14* (2006.01)
*H04L 9/40* (2022.01)

(52) U.S. Cl.
CPC .. *H04L 63/105* (2013.01); *G06F 2203/04803* (2013.01); *G06F 2203/04804* (2013.01)

(56) References Cited

U.S. PATENT DOCUMENTS

| | | | |
|---|---|---|---|
| 8,291,334 B1 | 10/2012 | Castellanos et al. | |
| 8,316,089 B2 | 11/2012 | Thakkar et al. | |
| 8,346,868 B2 | 1/2013 | Nakajima | |
| 8,473,851 B2 | 6/2013 | DeGrazia | |
| 8,749,610 B1 | 6/2014 | Gossweiler et al. | |
| 8,964,947 B1 | 2/2015 | Noolu et al. | |
| 9,225,763 B2 | 12/2015 | Baird et al. | |
| 9,483,752 B1 | 11/2016 | Raju et al. | |
| 9,575,712 B2 | 2/2017 | Farouki | |
| 9,635,091 B1 | 4/2017 | Laukkanen et al. | |
| 9,749,367 B1 | 8/2017 | Kirby et al. | |
| 9,800,627 B2 | 10/2017 | Sun | |
| 9,858,032 B2 | 1/2018 | Kim | |
| 10,091,260 B2 | 10/2018 | Sanso et al. | |
| 10,127,524 B2 | 11/2018 | Burtner et al. | |
| 10,129,335 B2 | 11/2018 | Mabey et al. | |
| 10,182,093 B1 | 1/2019 | Klapuri | |
| 10,264,213 B1* | 4/2019 | Sculley | H04N 7/15 |
| 10,291,597 B2 | 5/2019 | Li et al. | |
| 10,326,807 B2 | 6/2019 | Mohan et al. | |
| 10,382,507 B1 | 8/2019 | Ledet | |
| 10,452,769 B1 | 10/2019 | Benavidez et al. | |
| 10,476,885 B2 | 11/2019 | Lang et al. | |
| 10,484,189 B2 | 11/2019 | Albrecht | |
| 10,686,887 B2* | 6/2020 | Sekharan | H04L 65/613 |
| 10,701,082 B2 | 6/2020 | Lang et al. | |
| 10,733,005 B1 | 8/2020 | Zelenov et al. | |
| 10,782,844 B2 | 9/2020 | Farouki | |
| 10,805,375 B2 | 10/2020 | Cho et al. | |
| 10,893,081 B2 | 1/2021 | Lo et al. | |
| 10,908,896 B2 | 2/2021 | Lang et al. | |
| 10,915,492 B2 | 2/2021 | Rexer | |
| 11,032,090 B2 | 6/2021 | Archer et al. | |
| 11,069,006 B2 | 7/2021 | Colafranceschi et al. | |
| 11,093,046 B2 | 8/2021 | Hassan | |
| 11,157,241 B2 | 10/2021 | Kenkre et al. | |
| 11,188,349 B2 | 11/2021 | Thigpen et al. | |
| 2002/0111996 A1 | 8/2002 | Jones et al. | |
| 2003/0014513 A1* | 1/2003 | Ruths | G06F 9/465 |
| | | | 709/223 |
| 2003/0101235 A1 | 5/2003 | Zhang | |
| 2003/0105820 A1* | 6/2003 | Haims | G06Q 10/10 |
| | | | 709/227 |
| 2004/0181579 A1 | 9/2004 | Huck et al. | |
| 2004/0181796 A1* | 9/2004 | Fedotov | G06F 3/1454 |
| | | | 719/323 |
| 2005/0108033 A1 | 5/2005 | Everett-Church | |
| 2006/0026502 A1* | 2/2006 | Dutta | G06F 40/166 |
| | | | 715/201 |
| 2006/0080432 A1* | 4/2006 | Spataro | H04L 12/1831 |
| | | | 709/224 |
| 2006/0101422 A1 | 5/2006 | Bourges-Waldegg et al. | |
| 2006/0136441 A1 | 6/2006 | Fujisaki | |
| 2007/0294626 A1* | 12/2007 | Fletcher | H04L 67/131 |
| | | | 715/751 |
| 2007/0296643 A1 | 12/2007 | Ben-Shachar et al. | |
| 2009/0144368 A1 | 6/2009 | Andersen | |
| 2009/0164581 A1 | 6/2009 | Bove et al. | |
| 2009/0172101 A1* | 7/2009 | Arthursson | G06F 3/0486 |
| | | | 709/205 |
| 2010/0192071 A1 | 6/2010 | Noguchi | |
| 2010/0192107 A1 | 7/2010 | Takahashi | |
| 2010/0268756 A1 | 10/2010 | Lo et al. | |
| 2011/0055329 A1 | 3/2011 | Abt, Jr. et al. | |
| 2011/0249024 A1 | 10/2011 | Arrasvuori et al. | |
| 2012/0023407 A1* | 1/2012 | Taylor | G06F 3/04842 |
| | | | 715/731 |
| 2012/0054355 A1 | 3/2012 | Arrasvuori et al. | |
| 2012/0110088 A1 | 5/2012 | Su et al. | |
| 2012/0221959 A1 | 8/2012 | Bhogal et al. | |
| 2012/0231441 A1 | 9/2012 | Parthasarathy et al. | |
| 2012/0262533 A1 | 10/2012 | Gannu et al. | |
| 2012/0290943 A1 | 11/2012 | Toney et al. | |
| 2012/0297305 A1* | 11/2012 | Hehmeyer | H04L 51/043 |
| | | | 715/733 |
| 2013/0007290 A1 | 1/2013 | Yang | |
| 2013/0036167 A1 | 2/2013 | Bazot et al. | |
| 2013/0054734 A1* | 2/2013 | Bond | G06F 9/4856 |
| | | | 709/217 |
| 2013/0091440 A1 | 4/2013 | Kotler et al. | |
| 2013/0132455 A1* | 5/2013 | Mangini | G06Q 10/10 |
| | | | 709/201 |
| 2013/0144950 A1 | 6/2013 | Sanakaranarasimhan et al. | |
| 2013/0215116 A1 | 8/2013 | Siddique et al. | |
| 2013/0268872 A1 | 10/2013 | Yin et al. | |
| 2013/0318593 A1* | 11/2013 | Smith | G06F 16/907 |
| | | | 709/225 |
| 2014/0282013 A1 | 9/2014 | Amijee | |
| 2014/0351223 A1 | 11/2014 | Pall et al. | |
| 2014/0365580 A1* | 12/2014 | Azenkot | G06F 3/0346 |
| | | | 709/205 |
| 2015/0026257 A1 | 1/2015 | Balakrishnan et al. | |
| 2015/0082148 A1* | 3/2015 | Lai | G06F 40/151 |
| | | | 715/235 |
| 2015/0135214 A1 | 5/2015 | Reisman | |
| 2015/0193406 A1* | 7/2015 | Lemonik | G06F 40/166 |
| | | | 715/255 |
| 2015/0254222 A1 | 9/2015 | Shadfar | |
| 2015/0319197 A1 | 11/2015 | Capt et al. | |
| 2015/0319200 A1 | 11/2015 | Nguyen et al. | |
| 2015/0326575 A1 | 11/2015 | Ramirez Flores et al. | |
| 2015/0358391 A1* | 12/2015 | Moon | G06F 11/302 |
| | | | 709/224 |
| 2016/0062990 A1 | 3/2016 | Lee | |
| 2016/0080437 A1 | 3/2016 | Haggar et al. | |
| 2016/0142471 A1 | 5/2016 | Tse et al. | |
| 2016/0210273 A1 | 7/2016 | Kelappan et al. | |
| 2016/0210602 A1* | 7/2016 | Siddique | G06Q 20/047 |
| 2016/0232647 A1* | 8/2016 | Carlos | G06F 3/1454 |
| 2016/0246787 A1 | 8/2016 | Zhang | |
| 2016/0259522 A1 | 9/2016 | Gonzalez et al. | |
| 2016/0306964 A1 | 10/2016 | Austin et al. | |
| 2016/0314509 A1 | 10/2016 | Renshaw et al. | |
| 2017/0024100 A1* | 1/2017 | Pieper | H04L 67/01 |
| 2017/0041296 A1 | 2/2017 | Ford et al. | |
| 2017/0078449 A1 | 3/2017 | Pavlov et al. | |
| 2017/0104796 A1 | 4/2017 | Fahey | |
| 2017/0123751 A1 | 5/2017 | Sigurosson et al. | |
| 2017/0277696 A1 | 9/2017 | Sekharan | |
| 2018/0039385 A1 | 2/2018 | Worley et al. | |
| 2018/0062852 A1 | 3/2018 | Schmahmann | |
| 2018/0136815 A1* | 5/2018 | Tomizuka | G06F 3/011 |
| 2018/0196788 A1* | 7/2018 | Grigorovitch | G06F 16/972 |
| 2018/0219849 A1 | 8/2018 | Jones et al. | |
| 2018/0219923 A1* | 8/2018 | Berger | H04L 67/141 |
| 2018/0260369 A1 | 9/2018 | Meyer et al. | |
| 2018/0302233 A1 | 10/2018 | Viera et al. | |

(56) References Cited

U.S. PATENT DOCUMENTS

| | | |
|---|---|---|
| 2018/0343134 A1 | 11/2018 | Press et al. |
| 2019/0004693 A1 | 1/2019 | Faulkner |
| 2019/0079949 A1 | 3/2019 | Nichols et al. |
| 2019/0087438 A1* | 3/2019 | Nelbach, Jr. .......... G06F 3/1454 |
| 2019/0129582 A1* | 5/2019 | Uchiumi ................ G06F 16/168 |
| 2019/0179501 A1* | 6/2019 | Seeley .................. G06F 16/178 |
| 2019/0179916 A1* | 6/2019 | Sivaji ...................... G06F 16/34 |
| 2019/0207929 A1 | 7/2019 | Koorapati et al. |
| 2019/0220177 A1* | 7/2019 | Guido ................. G06F 16/1774 |
| 2019/0238599 A1 | 8/2019 | Ingale et al. |
| 2019/0286290 A1 | 9/2019 | Banerjee et al. |
| 2019/0361580 A1 | 11/2019 | Dowling et al. |
| 2019/0391858 A1 | 12/2019 | Studnicka |
| 2020/0058279 A1 | 2/2020 | Garrison |
| 2020/0067997 A1* | 2/2020 | Hardee ................. G06F 40/166 |
| 2020/0076862 A1* | 3/2020 | Eliason ............... G06F 3/04897 |
| 2020/0090126 A1 | 3/2020 | Chung et al. |
| 2020/0106813 A1 | 4/2020 | Vendrow et al. |
| 2020/0126513 A1* | 4/2020 | Lau .......................... G09G 5/14 |
| 2020/0134572 A1 | 4/2020 | Dhara et al. |
| 2020/0145499 A1 | 5/2020 | Kaplan et al. |
| 2020/0218492 A1 | 7/2020 | Farivar et al. |
| 2020/0296147 A1 | 9/2020 | Eliason et al. |
| 2020/0396278 A1 | 12/2020 | Miller et al. |
| 2021/0012270 A1* | 1/2021 | Lim ............... G06Q 10/063118 |
| 2021/0056077 A1* | 2/2021 | Sapru .................. H04L 67/1095 |
| 2021/0075832 A1 | 3/2021 | Bisztrai et al. |
| 2021/0117050 A1 | 4/2021 | Lewbel et al. |
| 2021/0124468 A1* | 4/2021 | Song .................... G06F 9/44521 |
| 2021/0135895 A1 | 5/2021 | Cheung |
| 2021/0181938 A1* | 6/2021 | Hassan ................. G06F 3/1454 |
| 2022/0200997 A1 | 6/2022 | Chan et al. |

\* cited by examiner

COLLABORATIVE REMOTE INTERACTIVE PLATFORM

CROSS REFERENCE TO RELATED APPLICATIONS

This application is a continuation of U.S. patent application Ser. No. 18/201,292 filed on May 24, 2023, which is a continuation of U.S. patent application Ser. No. 17/720,588, filed on Apr. 14, 2023 and issued as U.S. Pat. No. 11,662,970 on May 30, 2023, which is a continuation of U.S. patent application Ser. No. 17/567,315, filed on Jan. 3, 2022 and issued as U.S. Pat. No. 11,314,474 on Apr. 26, 2022, which is a continuation of U.S. patent application Ser. No. 17/383,671, filed on Jul. 23, 2021 and issued as U.S. Pat. No. 11,249,715 on Feb. 15, 2022, which is a continuation-in-part of U.S. patent application Ser. No. 17/337,624, filed on Jun. 3, 2021 and issued as U.S. Pat. No. 11,190,557 on Nov. 30, 2021, which claims priority from U.S. Provisional Patent Application No. 63/128,321, filed on Dec. 21, 2020 and from U.S. Provisional Patent Application No. 63/043,081, filed Jun. 23, 2020, all of which are hereby incorporated by reference herein in their entireties.

FIELD OF TECHNOLOGY

Aspects of the disclosure relate to digital platforms. Specifically, aspects of the disclosure relate to digital platforms for remote interaction.

BACKGROUND OF THE DISCLOSURE

Over the past twenty years, the way in which people shop for everyday products has radically changed. E-commerce is now a $4 trillion industry involving nearly every category of products that once could only be purchased by visiting a physical store. E-commerce allows commerce to be conducted anywhere you have a mobile device, provides price and quality transparency, time savings, ability to service the long-tail of demand, and much more.

There is now a large-scale transformation in how people and devices interact with each other. As an illustrative example, there is a transition in how service providers interact with their clients in the $8 trillion-plus service sector. The transition is driven by factors similar to those that drove the adoption of e-commerce, including: client expectations of being able to do anything from anywhere; modern technology platforms that allow people to discover service providers from around the world; and factors limiting physical and geographic mobility.

Recently, there has been a significant growth in adoption of video streaming platforms such as YouTube, Coursera, and others. Video streaming platforms may be effective for asynchronous communication of content and entertainment, but lack real-time interaction capabilities that many remote session participants require.

Additionally, there has been a rapid adoption of video conferencing tools to attempt to deliver services like group fitness, music lessons, physical therapy, and more. Synchronous video conferencing tools like Zoom, Skype, WebEx, and Google Meet may suffice for conversations and presenting documents like spreadsheets and presentations. These tools were designed to replace in-person business meetings and thus lack the interactivity, personalization, and pre- and post-session experience that may be needed by service providers and their clients, as well as by participants seeking remote interactive experiences.

For at least these reasons, it would be desirable to provide systems and methods to enable participants to engage in collaborative, interactive sessions even when the participants are physically remote.

SUMMARY OF THE DISCLOSURE

A method for providing a remote interactive experience via a digital platform is provided. The method may include receiving instructions from a host device to configure a virtual room. The virtual room may be configured to be accessible to a plurality of participant devices. The method may also include receiving, from the host device, a present command. The present command preferably instructs for the plurality of participant devices to attend a presentation of—i.e. to view—a virtual room conducted by the host device.

In response to the request, the method may render a canvas on a screen of the plurality of participant devices. The canvas may include a customizable graphical representation. The canvas may be configured at least in part based on the instructions of the host device.

The instructions may include a selection of one or more interaction apps for inclusion in the canvas. The interaction apps may be selected from a set of interaction apps.

The one or more participant devices may be associated with a level of access to the interaction apps. The level of access may be based at least in part on the instructions. The level of access may include a set of rules that define, for each of the one or more participant devices which interaction apps are included in the canvas, which interaction apps the plurality of participant devices are permissioned to control, and/or a level of permission of the plurality of participant devices to modify an interaction app.

Each of the plurality of interaction apps may include a coordinated window. The coordinated window may be activated, at the plurality of participant devices, by the present command. The coordinated window may be initiated with a layout and a content. The layout may include a size, a shape, and a screen position. The content may include words and/or images that are displayed within the coordinated window.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
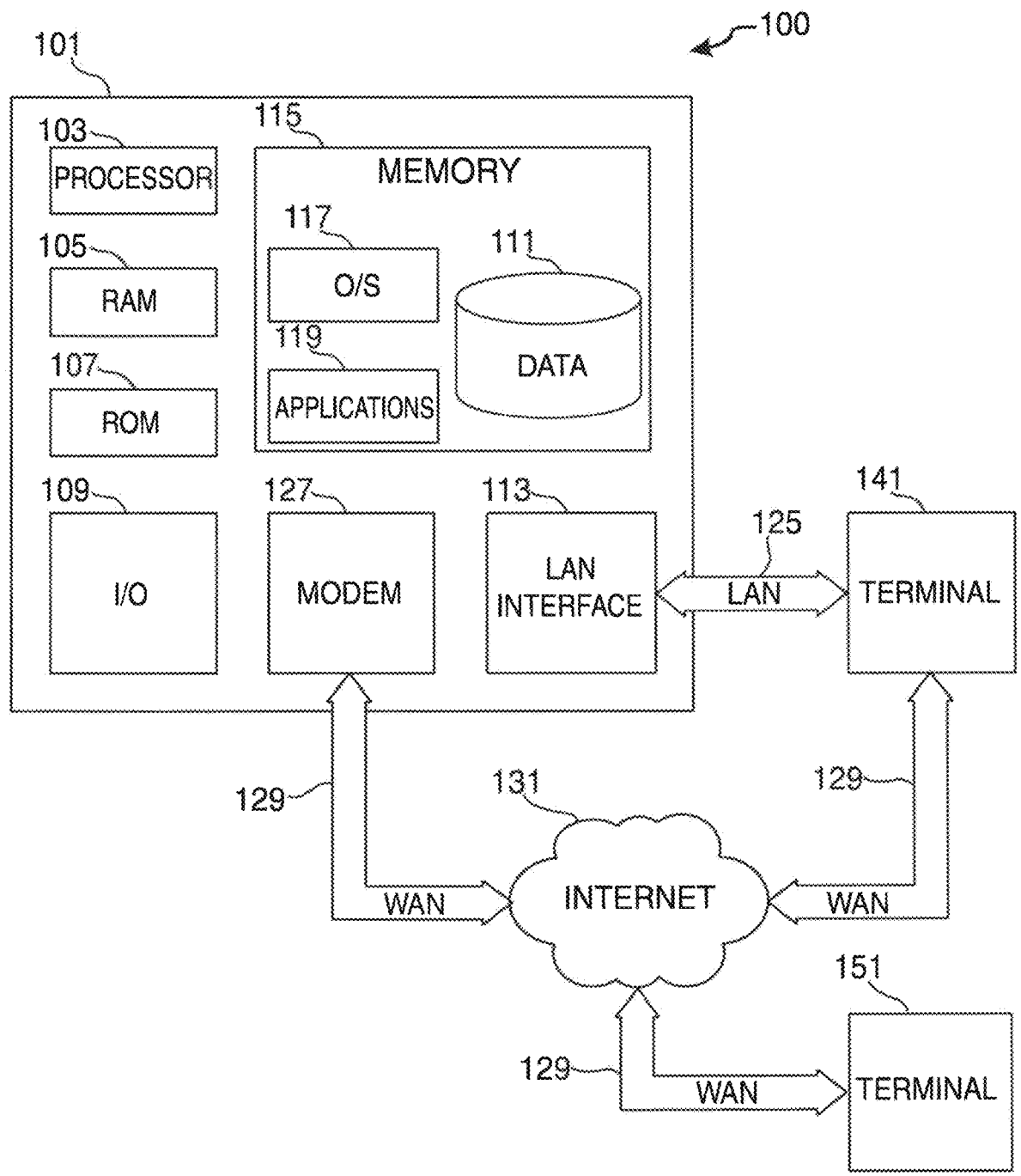
FIG. 1 shows an illustrative system in accordance with principles of the disclosure.

Systems and methods are provided that enable participants to interact with each other even when the participants are physically remote. The systems and methods may effectively deliver services and/or features that were traditionally only available in person. Service providers and clients may be used herein as one illustrative example of any suitable group of participants in any suitable session, meeting, or conference. One or more of the participants may be a host. A service provider may, for example, be a host. Anything described herein in reference to service providers and/or clients may, in certain embodiments, be applied to any suitable participant in a remote digital session.

Prior remote teleconferencing systems have a number of deficiencies, especially when these systems involve interaction between participants. Exemplary deficiencies of prior systems include:

Service providers and clients struggle through overlapping and contentious video and audio streams.

Clients see poor quality multimedia streams played by the Service Provider. This may include music or video that the service provider is playing from a 3rd party server that is first being routed to the service provider's machine, and then routed over the video connection to the clients.

Clients have no control over what they see, when they see it, what order they view the livestream, and so on.

Service providers cannot share interactive tools for the use of the clients.

Service providers cannot deliver a personalized experience to the customer. It is one size fits all (or one screen-share fits all).

Participants cannot collaborate over a coordinated file where actions (including content, navigation, and/or layout modifications) by one participant are synchronized and updated for all the participants.

In group sessions, service providers cannot easily momentarily focus on one client within a group of clients without cumbersome options like breakout rooms that separate the service provider from the other participants.

Service providers cannot typically develop digital interaction methods tailored to the needs of their specific service. For example, a yoga instructor interacting with their clients has a very different type of interaction than a music teacher or a language tutor or a physical therapist.

Service providers find it overwhelming to string together existing technologies and tools in order to provide their services.

Service providers cannot easily package segments of the session for the consumers to review or practice after the session.

Hosts cannot custom configure multiple virtual "rooms" that persist in their custom configurations, and can be "visited" and used by the host and invited participants at will.

Aspects of the disclosure provide systems designed to address the issues identified above. Exemplary features of the disclosed systems are described in the ensuing paragraphs.

In conventional prior art systems, video is dominant, and other data and media forms are subordinate. Disclosed systems provide a canvas on which one may tailor his or her view of the underlying global data model. Each user may render his or her own view of the underlying data.

Live interaction authoring by the Provider: Disclosed systems may include features for hosting a live interaction stream with interaction apps. The interaction apps can be activated and appropriately displayed by the Provider to improve the interaction experience with the clients. For example, one interaction app could provide alternate camera views of the Service Provider. In another example, an interaction app for a music teacher could provide a time synchronized view of sheet music that clients should follow.

In yet another example, an interaction app for session participants may include a coordinated window. The coordinated window may be displayed on the screens of some or all of the participant devices that are participating in a session. Modifications made to the window by the host (and/or any other participant that is able to modify the window) may be synchronized and generalized to the windows shown on all of the participant devices. Modifications may include modifications to the content, navigation, size, shape, and/or layout of the window or the contents thereof.

The coordinated window may be activated by the host. In certain embodiments, some or all of the participants may also be able to activate a coordinated window. The host may be able to set which of the participants are able to activate and/or modify a coordinated window.

A coordinated window may contain and display any other app. A coordinated window may contain and display a file or document. For example, the coordinated window may be activated to display a pdf, jpg, or other suitable file. The window may be initialized on a certain page of the file (e.g., page 1). The window may be initialized to be a certain size and shape and at a certain location on the screen. The size, shape, screen location, and page being displayed may be uniform across all the participant devices in the session. A participant (e.g., the host or another permissioned participant) may navigate to page 2. This action may cause the windows on all the devices in the session to navigate to page 2 of the file. Similarly, a participant may resize and/or relocate the window on his or her screen. In some embodiments, these actions may also be mirrored by the windows of all the other participant devices. In some embodiments, a participant may be able to zoom in, or crop, the contents of the window. A participant may be able to execute various other actions to and within the window. Some or all of these actions may be mirrored by the windows of some or all of the other participant devices. A coordinating window may thereby augment collaborative properties to a file or document that typically does not have such properties.

In another illustrative embodiment, a coordinating window may be activated to display a shared web browser. In another embodiment, a coordinating window may be activated to display a shared document. The shared document may be cloud based. Content within the shared document may be modifiable. Modifications made to the shared document by one participant may be updated and mirrored in the windows of the other devices in the session. For example, the shared document may include a word processor. The participants in the session may be able to navigate, view, and otherwise collaborate on text shown in the word processor. One participant may delete, modify, and/or type new text in the shared document, and the shared document may be synchronized and updated accordingly across all the devices.

In some embodiments, the host of a session may be able to customize the coordination settings. For example, the host may be able to permission some or all of the participants. The host may also be able to customize which actions are generalized and which are not. For example, the host may enable content modifications to be generalized, but not navigation, size, or position. The host may enable navigation to be generalized, but not size or position. The host may enable size to be generalized, but not position. The host may, in certain embodiments, be able to set any other suitable custom setting.

The platform may thus provide a tool that is especially useful for a collaborative work, e.g., a group collaborating on a project. The platform may include a shared browser. The shared browser may be cloud-based. In some embodiments, the platform may, in operation, allow the multiple participants access to the same shared browser. The participants may be associated with different permission levels to execute actions to the shared browser, as described herein.

The collaborative platform as described, may, in certain embodiments, operate differently than a synchronized document. A synchronized document may allow multiple users to access and modify a shared file. The modifications may all be applied to the shared file, which may be updated based on the modifications. Each user may then access the updated file separately on separate browsers and on separate devices. Such a synchronized file may allow for remote sharing of updates, but many other collaborative features are lacking.

The disclosed collaborative platform, however, may, in some embodiments, provide the users simultaneous, collaborative access to a single, remote, shared browser. The collaborative platform may provide an experience that is much more collaborative than a synchronized document. For example, all actions performed by all participants may be propagated to the shared browser, and by extension to all the participant devices which are accessing the shared browser. This may include inputs, gestures, cursor movements, and modifications. This may also include window sizing, positioning, navigating, and any other suitable action performed to a shared browser.

The collaborative platform may also provide features that solve challenges that may be encountered when multiple users access a shared browser. For example, one challenge encountered may involve collisions, and how to coordinate multiple inputs performed on separate participant devices.

One provided feature may include animating certain actions on the shared browser to notify other users that the actions are being performed on a device. For example, a clicking action may draw some waves or lines around the cursor (e.g., like waves in a water puddle. A drag action may show some trail lines, as if a small boat is being dragged on water. The animations may be subtle and inconspicuous, but may serve to notify other users to the action (e.g., dragging, clicking, right clicking, shaking, typing) being performed by one user.

Another provided feature may address a challenge that when multiple people are using the same app, conflicts of typing, mouse operations, finger gestures or other conflicting input actions may occur. A buffer may be provided that will allow a user who first initiates an action, to complete his/her operation (e.g., they may be allowed to finish typing the sentence). For example, if user 1 starts to type text, the server may allow user 1 to retain exclusive focus on the browser for a preset amount of time (e.g., 1, 2, 3 seconds, or other suitable amount of time). Exclusive focus may prevent actions of other users from being applied to the browser. In some embodiments, the platform may save the other actions of other users in a buffer, and apply them, in order they were performed, when the exclusive window of user 1 terminates.

Moreover, the platform may track the buffered actions, and apply them as appropriate to the current state of the browser. For example, if user 2 clicked on a certain location on the browser (e.g., a word or button) while user 1 has exclusive focus, and during the exclusive focus user 1 navigates the content in the browser such that the word or button is no longer in the same location as when user 2 performed the click, the platform may apply the click to the word or button even though it is in a different location than when user 2 performed the click.

In certain embodiments, or for certain inputs, the platform may be configured to combine inputs received from multiple users into a combined input for the shared browser. For example, when the input includes audio input received from microphones on the user devices, the platform may be configured to combine the audio inputs and apply the combined audio input to the browser. The combined audio input may be later parsed into its constituent parts. This may be useful, for example, when the platform employs an AI-based language processing tool to receive and act upon audio instructions.

Another challenge that may be addressed by the collaborative platform relates to security. For example, a security concern may arise when one user signs into a site that contains, or has access to, sensitive information. This may present an opportunity for other users to access, and possibly compromise, that sensitive information. A solution may be provided in the form an app level feature that tracks the owner of the sensitive information. For example, if user 1 signs into a site with sensitive information, the platform may detect when user 1 leaves the room. In response, the system may automatically log out of the sensitive site. The system may close the application. The system may send the owner of the sensitive information an alert that his/her information is vulnerable to being accessed by the other users.

In some embodiments, even when the user is in the room, security precautions may be taken to protect sensitive data. For example, a user may have the option, when he/she logs into a sensitive site, to prevent other users from performing actions on the site. An option may also be provided to allow users to perform options to the page being accessed, but may prevent other users from navigating away from that page and accessing other, possibly sensitive, pages.

Another contemplated feature may include providing an option for a user to retain a private portion of the canvas. A user may thereby have a private portion of his/her canvas that is not a part of the shared browser, alongside a public portion of the canvas that is based on the shared browser and is shared across all devices.

Another feature of the platform may enable a user to transfer credentials and/or identities from a local system to the shared browser. For example, if a user is signed into and authenticated by a secure system on his/her local device, the local authentication may be transferred to the shared browser without the need to reauthenticate.

In some embodiments of the platform, a session may be initiated when participants join a room. Apps may be added, activated, or used once the session is under way. In other embodiments, the platform may be configured to be initiated from within a document or website. For example, a button may be provided which, when a file or webpage is open, launches the file or webpage in a canvas, and invites participants to join and collaborate on the webpage or document. For example, a travel planning website may be set up to have an integrated button which a user can select. When the user selects the button, he/she may be able to invite other users to collaborate on planning a trip. Other websites which may benefit from such a feature may, for example, include e-commerce sites, software as a service (SAAS) sites, and sites that provide support and training.

In other embodiments, the button may be provided as a browser add-on so a user can create an interactive session from any webpage in the browser. In yet another embodiment, the button may be an icon on a computing device which may be able to create an interactive session from any window opened on the device.

An exemplary process flow may include: a button (which may, in some embodiments, say something like "together" or some similar message which may convey the function of creating a collaborative session) is presented on a web site, SAAS app (source URL), browser extension, or desktop icon. A user may select the button. Selecting the button may trigger a session room to initiate. The configuration of the room may be preset by the website or the user. The room may initiate with a shared browser with the URL of the website from which the user selected the button. The user may be able to invite others to the room. In some cases, the user may invite support from the company's customer support personnel. In those cases, the invite operation may place the user in a queue until a representative is available to join.

In some embodiments of the platform, the host participant may preconfigure one or more virtual "rooms." Each room may be configured with custom default settings. The settings may relate to the look (e.g., background, colors, etc.) and/or functionality (e.g., audio and video settings, apps that are included in or can be added to the canvas, permissions for what some or all the participants are capable of accessing, activating, or modifying, etc.). The room configurations may, in certain embodiments, be persistent. For example, a host may configure a number of rooms with custom settings, and the settings may be saved, and may remain the default settings for those rooms for future sessions.

The host may invite the participants to a room. Each participant may be associated with a participant device. An invitation may include a uniform resource locator (URL) link, a room ID and/or password, or any other suitable invitation. A participant may access the room by clicking on the link and/or following the URL. A participant may access the room by navigating to a website. A participant may access the room via an add-on to a browser that may provide a shortcut to access the room. A participant may access the room via a dedicated app on a computing device or smart phone.

Upon accessing the room, each participant device may display a canvas with one or more apps according to the configuration of the host. For example, the canvas displayed on the screens of all the participant devices may include video icons displaying video feeds from cameras on each of the participant devices (along with audio from microphones on the participant devices). The canvases might also display buttons for activating other apps. The buttons may be displayed on the host canvas. The host may configure the session so that the buttons are also displayed on the canvases on some or all of the participant devices. The buttons may include a button for activating a coordinated window, a button for activating a shared browser, a button for activating a shared document, and/or any other suitable button for activating any other app or feature that may be available for the canvas. For example, the buttons may include a button for activating a share screen. Selecting a share screen button may open a window that provides options for selecting one or more windows running on the selector's device for sharing.

In certain embodiments, interaction apps may be developed and initiated by the Service Provider (SP), or another user configuring a canvas. Apps may also be developed by third party developers taking advantage of suitable APIs. Apps may, in some embodiments, be included in a downloadable version of the platform. Apps may, in some embodiments, be accessed in an app store. In certain embodiments, some Apps may be included by default as part of a basic platform package, and the basic package may be augmented by creating and/or downloading additional Apps.

Exemplary interaction apps may include apps for music, language learning, group exercise, group lessons around games and sports, and other suitable areas.

Interaction Apps may also include website embedding, voting, share folders, metronome, trivia, notes, marking/bookmarking video, mirror/recording, shared games (e.g., Chess), multiple cameras on either side, practice programs and reminders.

Live interaction composition on the client side: A client (otherwise referred to herein as a participant) in a live interaction streaming session may, in certain embodiments, choose his or her own interaction experience. A client may choose which of the interaction app streams they want to engage with and/or how those interaction app streams are arranged on his or her viewing device.

In certain embodiments, the client's viewing device could compose an optimized interaction experience based on the local computational resources, network connectivity, and user preferences. For example: An interaction app may instruct the clients to view a YouTube video, and direct the client device to stream the video from a server close to and well connected to the client, eliminating the need for the Service Provider to stream the video from his or her local computing device thereby introducing delays and bandwidth related video/audio quality problems.

Client attention moments: During a group interaction session, certain embodiments of the platform may seamlessly enable a Provider to momentarily pay attention to, focus on, and interact with one client, for instance in a secondary interaction stream, while allowing the rest of the clients in the group session to continue viewing a primary interaction stream.

Practice sessions: In some embodiments, a client may be able to record his or her interaction with his or her canvas (e.g., a practice session), go back in time to review and/or correct a portion (e.g., 10, 15, or 30 seconds, or any other suitable amount of time) of the interaction, annotate and tag the interaction stream, capture multiple attempts, and/or share portions of the interaction stream with his or her Provider. Annotations and tagging could be achieved via voice interface, touch sensitive screens, or text annotations. In another example, a Provider can join the client session stream to interact directly with the client, including recording and annotating portions of the client's session stream directly on the client's behalf. In yet another example, the Provider may be able to review and annotate a portion of a client stream (e.g., a practice session), and, in real time, deliver the annotated portion to the client.

Interactive teaching agents: A SP and/or a client in a practice session stream may, in certain embodiments, initiate an instance of an autonomous practice training agent that monitors the practice session stream to capture the quality of the client's performance of the assigned practice task. The agent may provide real-time feedback to the client and/or the SP. In another example, the Service Provider could provide tests or exercises for the client.

Interactive practice session dashboard: In certain embodiments, the platform may include a dashboard for the Provider to view performance metrics. The dashboard may display performance metrics of one or more participants. The dashboard may be customizable. The dashboard may display the metrics in real-time and/or as part of a post-session report. The performance metrics may include information generated by autonomous training agents. The performance metrics may include information about participant response to tests or other exercises.

Asynchronous interaction stream replay: In some embodiments of the platform, each interaction app may generate an Interaction Data, Event and Action stream (IDEA stream). Each of these IDEA streams may be captured, time-synchronized and stored together. The IDEA streams may include session data segmented and compartmentalized into separately identified portions. For example, a camera video feed (which may correspond to one interaction app selected to be part of a canvas) may be one portion. A slideshow playing on another app may be a separate portion. A quiz given via another app may be yet another portion. Furthermore, metadata may be generated and saved along with the data streams. The metadata may identify and categorize the data contained in each data stream. Separating and identifying the data in this way may enable organization and access to data that may not be feasible with conventional systems. Clients and Providers may be able to replay the interactive sessions, and may be able to compose a personalized interaction experience. The personalized experience may include choosing one or more of the IDEA streams to view and/or arranging the streams in a way that best suits that viewer and viewing device.

Indexing of live interaction stream by navigation actions of Provider and Clients: During a session, a Provider and/or a client may navigate between sections of composed interaction apps, and may also navigate within the content of individual composed interaction apps. These navigation actions may form part of the captured IDEA streams. Navigation actions may be selectively extracted into an index of the captured IDEA streams. The index serves as a time-linked "table of contents" and can be personalized for individual users. The indexed actions may be represented hierarchically based on whether they're recorded from within-interaction-app navigation, between-composed-apps navigation, or other hierarchy inherent in the content captured in the IDEA streams.

Exemplary Implementations

Exemplary implementations of systems with above-mentioned features are described below. The exemplary implementations are provided for purposes of illustration rather than limitation.

Disclosed systems may include at least three entities: A "User Device," which may include a processor, network interface, video and audio input devices, display and audio output devices, additional input/output devices, and/or other suitable elements. A "Coordinating Server," (otherwise referred to herein as a central, or cloud-based, server) which may include a processor, storage device, network interface, and/or other suitable elements. A "Content Delivery Server," which may include a processor, storage device, network interface, and/or other suitable elements.

One User Device, associated with a user distinguished as the Service Provider (alternatively referred to as a Host), may initiate a Session by contacting a Coordinating Server through its network interfaces. The Coordinating Server may create an initial, durable Session Record on a storage device. The creation of the Session by the SP (Host) may be captured by a Session Event that may be added to the Session Record.

One or more additional User Devices, associated with users denoted Participants, may join the Session by contacting a Coordinating Server through their network interfaces. The Participants may, in certain embodiments, be authenticated before joining the session. Authentication may be achieved via a passcode, biometric identification, login from a trusted device or account (e.g., from a set of devices or accounts authorized by the host), and/or any other suitable form of authentication. The connection of a Participant to the Session may be captured by a Session Event that may be added to the Session Record.

The display output devices of connected User Devices may be coordinated at least in part via Canvases. At the beginning of a Session, the SP (Host) and Coordinating Server may configure an initial Canvas. A Canvas may include a graphical representation with customizable content and/or layout. Canvases may be configured to include content, such as selected Apps and/or other features. Canvases may have associated properties such as title, aspect ratio, background, and others. The Host may configure one Canvas for display on all participating devices throughout the session. In some embodiments, the host (or, optionally, one of the clients) may configure multiple canvases for display on different participant devices and/or sequentially on the same devices. In some embodiments, all canvases are pre-configured prior to a session. In other embodiments, one or more of the canvases may be configured and/or modified mid-session.

Creating and/or loading a subsequent canvas may be a result of an explicit action. A user configuring canvases may be presented with multiple action options. Exemplary action options include: "Next": when using a sequence of pre-composed canvases, switch to the next one in the sequence; "New": make a freshly-created, default canvas the next one; "Duplicate": make a new canvas and copy the layout of the current canvas into the new one; and "Insert Template": make a new canvas from a library of pre-composed templates.

A Session Event representing the appearance of the initial Canvas and its content may be added to the Session Record. During the Session, a User Device—usually associated with the SP (Host)—may contact the Coordinating Server to replace the current Canvas with a new or modified Canvas. The appearance of the subsequent Canvas, its properties, and its content may be captured by a Session Event that's added to the Session Record. The Coordinating Server may notify connected User Devices of the appearance of the new Canvas, and the User Devices' display output devices may update to show the content of the new Canvas. The content of the new Canvas may have been composed before initiation of the Session; for example, imported from the Session Record of a previous Session. Pre-composed Canvases may be referred to herein as Templates.

Some exemplary interaction apps and other exemplary preferred features of the disclosed systems are described below in further detail.

Interaction Apps

Canvas configuration may include content (e.g., one or more Apps) arranged into a layout: sizes, positions, z-ordering, and other properties that determine display of Apps relative to each other and the Canvas itself. Canvases can be composed and rearranged during Sessions by a User Device—usually the SP (Host)—sending a request to the Coordinating Server to update properties of the Canvas and its layout, including adding and removing Apps. The change to Canvas and/or App layout properties may be captured by a Session Event that may be added to the Session Record.

Apps may include a User Device-side component and (optionally) a Coordinating-Server-side component. Code modules within the User Device-side component incorporate a User Devices' view of the global data model for the Session and output visual and/or audio content to the User Devices' output devices. Coordinating Servers may send streams of events to User Devices over their network interfaces. Events in the streams usually result in User Device-side Apps updating visual and audio output, often because an event notifies an update to the global data model.

Different User Devices may have different authenticated identities and roles including, for example, SP (Host) and one or more Participants—within Sessions. User Device Apps' views of the global data model may be personalized to each User Devices' identity and role. Because of this personalization, Apps for different User Devices may in general receive different streams of events from Coordinating Servers within the same Session.

User Device Apps may also send outgoing streams of events to Coordinating Servers. In Coordinating Servers, the incoming streams of events from User Device Apps are received and processed by the second component of Apps, the Coordinating-Server-Side components. Upon receiving an incoming event from a User Device App component, Server-Side Apps may update the global data model and User Devices' views of the model, and initiate the sending of events to User Device Apps in return. Received events and effected data-model changes may be captured as Session Events which may be added to the Session Record.

Live Stream App

One example of an Interaction App is Live Stream, which streams from one video source and/or one audio source of a User Device. A video source might be an input video device like a camera, or a video stream of a User Devices' "screen", i.e., screenshare, or others. An audio source might be an input audio device like a microphone, or others. Video and audio sources might include multiple tracks, for example stereo audio or stereo (3D) camera. The unit of data sent from User Devices' source streams may be called a Frame. A Frame may include image and/or audio data.

The User Device-side component of Live Stream App may create the User Device video source stream in order to receive incoming Frames. Upon receiving a new Frame from the source stream, the User Device-side component of the Live Stream app may:

Optimistically update its local view of the global data model to cache the newly-received Frame and output it to display and/or audio-playback device(s); and/or Send an event to Coordinating Server(s) that includes the new Frame and other associated metadata.

Server-side components of the Live Stream App—and possibly other Server-side App components—may receive the incoming event. Server-side components of the Live Stream App may:

Use the incoming Frame data to update originating User Devices' information in the global data model;

Update other User Devices' views of the global data model;

Send events to User Devices whose views of the global data model changed in a previous step; and/or Capture the incoming event from the User Device as a Session Event and add it to the Session Record.

After the Coordinating Server sends events to User Devices whose views of the global data model changed, the User Device-side Live Stream App component for each User Device may receive the event and in return possibly outputs Frame data to local display and/or audio devices.

YouTube Player App

Another example of an Interaction App is YouTube Player, which may stream video and audio directly to User Devices from Content Delivery Servers. A User Device—usually the SP (Host)—may add an instance of YouTube Player to a Canvas and may parameterize it by the YouTube video URL and/or other properties. This User Device may be denoted the Controlling User Device. The Controlling User Device may send to a Coordinating Server an event that bundles a representation of the new YouTube Player instance and any changes to Canvas properties that resulted from including YouTube Player in the layout. Coordinating Server may capture the incoming event as a Session Event and may add it to the Session Record. The event may then be forwarded to the other User Devices—usually Participants—who may update their copies of the data model and render the new YouTube Player instance to an output display device, along with other changes to the Canvas.

The Controlling User Device may begin playback of the video by an action initiated through an input device, for example a "mouse click". The action may be sent to Coordinating Server where it may be: (i) captured as a Session Event and added to Session Record; (ii) used to update global data model; and/or (iii) forwarded to other User Devices—usually Participants. As User Devices receive updates to the global data model, playback of the YouTube video may be initiated. Each User Device may independently dial Content Delivery Servers to negotiate optimal video and audio streams given the User Device's processor(s), network interface(s), quality-of-service (QoS) preferences for e.g., lower latency vs higher quality, output display and audio devices, geographic location, and/or any other relevant environmental information.

During playback, the Controlling User Device may alter playback state by actions such as pausing at a timepoint, muting audio, seeking to a timepoint, and others. These actions and relevant properties may be sent to the Coordinating Server, captured as Session Events in Session Record, and/or forwarded to other User Devices—usually Participants—who may each effect the change(s) to their own YouTube Player playback state.

The YouTube Player may, in certain embodiments, additionally be configured to allow non-Controlling User Devices to effect changes in local playback state separately from the global data model of the Controlling User Device. Playback actions initiated by non-Controlling User Devices may be sent to Coordinating Server where they may be captured as Session Events and added to Session Record. The events may not effect changes in local playback state for other User Devices.

As each User Device reaches a predetermined timepoint in playback—usually the end of the video—the User Device-side YouTube Player App may send an event to Coordinating Server where it may be captured as a Session Event and added to Session Record. The Server-side YouTube Player App may update global data model to reflect the playback state change for the originating User Device. The change in global data model may then be sent as event(s) to User Device(s)—usually only the Controlling User Device—and the User Device-side YouTube Player App for the receiving User Device may update the local display device in response to the event, for example to render a widget showing the completion status of all User Devices.

Quiz App

Another example of an Interaction App is Quiz, which allows one User Device, which may be called the Quiz Master—usually the SP (Host)—to pose an interactive question for one or more (or all) other User Devices in the Session, usually Participants. The Quiz Master may be able to view answers and summary statistics from the other User Devices. The Quiz Master may add an instance of the Quiz App to a Canvas, parameterized by question(s), other properties like media, and/or lists of answers for questions where appropriate. Quiz Master may send to a Coordinating Server a representation of new Quiz instance and any changes to Canvas properties that resulted from including Quiz in layout. Coordinating Server may capture the event as a Session Event, and may add it to Session Record, update global data model, and/or forward events to other User Devices which may then update their Canvases and display devices.

The Server-side component of Quiz App maintains a data model of Quiz state for User Devices. As User Devices initiate actions to progress through Quiz, the User Device-side component of Quiz App sends the actions to a Coordinating Server, which captures them as Session Events and adds to Session Record. Server-side Quiz App updates the Quiz data model and forwards events to other User Devices—usually the Quiz Master only. The Quiz Master's User Device-side Quiz App may choose to render Quiz data model to a display device in one of multiple ways. Quiz Master might wish to view progress of other User Devices through Quiz, possibly showing correct/incorrect answers. Or, Quiz Master might wish to view a specific User Device's view of Quiz in order to, for example, provide assistance or assess lack of progress.

An important aspect of this method and apparatus is that User Devices may be restricted to access only portions of the data model for which the Server-side Quiz App has authorized them. One user's answers to Quiz might be sensitive, personal, or private data that users other than the Quiz Master may not be authorized to access. Additionally, different clients may be given different quizzes, which may be personalized by the Quiz Master based on age, gender, experience, skill level, or other suitable parameter.

Whiteboard App

Another example of an Interaction App is Whiteboard, which allows one or more User Devices, called Annotators—usually the SP (Host)—to "draw" on a portion of the Canvas. The tools for drawing may include, for example, freehand lines, straight lines from one point to another, shapes like rectangles and circles, solid fill, text labels, eraser, and more. In basic usage, Whiteboard may render to display devices with an opaque white background, for example, so that Annotators draw on a blank area.

In more advanced usage, Whiteboard may be composed with other Apps by "nesting" them within Whiteboard. This allows Annotators to draw "on top of" other Apps without the other Apps needing to be aware of Whiteboard functionality.

A User Device composing a Canvas—usually associated with the SP (Host)—may add an instance of Whiteboard App to a Canvas, parameterized by (i) background, or App nested within it; and/or (ii) whether all User Devices share the same Whiteboard state or whether each User Device has their own state. Composing User Device may then send to a Coordinating Server a representation of new Whiteboard instance and any changes to Canvas properties that resulted from including Whiteboard in layout. Coordinating Server may capture the event as a Session Event and may add it to Session Record, update global data model, and/or forward events to other User Devices which may update their Canvases and/or display devices.

Initially, Whiteboard may be in an inactive state with no active drawing tools. Any actions initiated from a User Device's input device that target the Canvas area of Whiteboard, for example a "mouse click", may, in certain configurations, be forwarded to an App nested within Whiteboard.

Annotator may select and activate a drawing tool by an explicit action initiated from input device. The action may be sent to a Coordinating Server, captured as Session Event, and added to Session Record. Properties of the drawing tool such as line width, color, etc., may be altered by further actions. Whiteboard may now be active and actions targeting the Canvas area of Whiteboard may be interpreted by the active drawing tool, for example by rendering a line on the display device. Each drawing action may be sent to a Coordinating Server, captured as a Session Event, and added to Session Record, updating global data model. If Whiteboard was parameterized to share state across all User Devices, then events may also be forwarded to other User Devices which may then render the result of drawing action to display device.

Annotator may then initiate an action from input device to deactivate Whiteboard, in which no drawing tools are active and Whiteboard returns to its initial state.

Attention App

Another example of an Interaction App is Attention, which may allow a first User Device, denoted Requester—usually a Participant—to request that a second User Device, denoted Observer—usually the SP (Host)—observe Requester's Canvas in order to provide live feedback.

Attention App may be (i) added to Canvas; (ii) a representation of Attention App may be sent to a Coordinating Server along with any changes to Canvas properties that resulted from including Attention in layout; (iii) Coordinating Server may capture the event as a Session Event and add to Session Record, updating global data model; and/or (iv) Coordinating Server may forward events to other User Devices which may update their Canvases and display devices.

The User Device-side component of Attention App may initially render to Observer's display device as a button labeled "Enable Attention", for example. Other User Devices' display devices might have a disabled, "grayed-out" button rendered that's labeled "Request Attention", for example.

Observer may activate Attention through an action initiated by an input device, for example a "mouse click". The initiating action may be (i) sent to a Coordinating Server; (ii) captured as a Session Event and added to Session Record; (iii) used to update global data model; (iv) and/or forwarded to other User Devices. Other User Devices—the potential Requesters—may then have Attention render to their display device an active, non-"grayed out" button labeled "Request Attention", for example.

Observer may see rendered to his or her display device a full-canvas view of other users associated with other User Devices. The representation of other users might be chosen based on operating environment such as processor, network interface, output display device, etc. Representations of other users might be "avatars" with text labels of user's names; or views of other User Devices' Canvases, possibly with reduced rate of Frame updates or simplified views with fewer features; or other suitable views.

A Requester might begin an Attention request through an action initiated by an input device, for example a "mouse click". The initiating action may be (i) sent to a Coordinating Server; (ii) captured as a Session Event and added to Session Record; (iii) used to update global data model; (iv) and/or forwarded to only the Observer. The Requester's User Device-side Attention App may then render a disabled, "grayed-out" button labeled "Attention Requested", for example.

The Observer's User Device-side Attention App may render an indicator to display device that attention was requested by Requester. This may take many forms, for example a "badge" rendered over representation of Requester User Device, or a box containing a list of one or more Requestors. User Device-side Attention App may render an indication of the chronological order of attention requests, for example by reordering the Requester and other User Device representations in some way, e.g., to give priority to a most recent requester that was not yet addressed.

Observer may begin giving attention to a Requester through some action initiated by an input device, for example a "mouse click". The initiating action may be (i) sent to a Coordinating Server; (ii) captured as a Session Event and added to Session Record; and/or (iii) used to update global data model. The User Device may then become the Active Requester. The Server-side Attention App may begin sending events from Active Requester to Observer. This may allow User Device-side Attention App to render to Observer's display device a view of Active Requester's Canvas. Observer can then control Active Requester's Canvas as if Observer were the Active Requester. In other embodiments, Observer may respond to a Request for attention by opening a line of communication with the requester, e.g., a text, audio, and/or video communication.

A representation of Observer may also be shared to Active Requester. This representation might be an avatar with text label of Observer's name; a live stream from Observer; or some other. The User Device-side Attention App for Active Requester may render the Observer's representation to display device. This representation might be rendered as a "picture in picture" box in a corner of Canvas, for example.

Observer and/or Active Requester may choose to end attention through an action initiated by an input device, for example a "mouse click". The action may be performed by either the Observer or the Active Requester, or by both the Observer and the Active Requester. Actions may, for example, be initiated simultaneously by Observer and Active Requester; the actions may be serialized by a Coordinating Server into Session Record, and global data model resolved into consistent state. The displays for both Observer and now-former Active Requester may update to state similar to before Requester became the Active Requester. Observer's display may additionally update to show now-former Active Requester without a badge or other previous indicator, and potentially reordered within list of User Devices.

Observers may, in certain embodiments, set limits on the number of attention requests from any one User Device or overall from all User Devices during a Session. In turn, a Requester that has exhausted his or her quota of requests might initiate some action to be allocated additional requests, including some form of payment to Observer.

Instant Replay App

Another example of an Interaction App is Instant Replay, which may allow a User Device to record and/or annotate a Canvas or a portion thereof. Instant Replay may build on the functionality of other apps, and may often be used with the Whiteboard and Attention Apps as described below. In some cases, Instant Replay App may allow a user—usually a Participant—to specify which one or more of the Interaction Apps in the user's Canvas to record and/or annotate.

Instant Replay App may be (i) added to Canvas, and may be parameterized by whether recording is automatic or manual; (ii) a representation of Instant Replay App may be sent to a Coordinating Server along with any changes to Canvas properties that resulted from including Instant Replay in layout; (iii) Coordinating Server may capture the event as a Session Event and add to Session Record, updating global data model; and/or (iv) Coordinating Server may forward events to other User Devices which then update their Canvases and display devices.

In manual recording mode, the User Device-side component of Instant Replay App may render to display device a button or indicator, e.g., an unobtrusive green or red circle that indicates the ability to start recording Canvas content or a portion thereof. User Device may begin recording an Instant Replay through some action initiated by an input device, for example a "mouse click". The event may be sent to a Coordinating Server, where it may be captured as a Session Event and added to Session Record, updating global data model. In response to transitioning into recording mode, User Device-side Instant Replay App may render a new button or indicator, e.g., a red or black square to indicate the ability to stop recording.

In manual recording mode, Instant Replay may record until a stopping event occurs. A stopping event may include (i) action of a user explicitly indicating to stop; (ii) Instant Replay App removed from Canvas; and/or (iii) current Canvas replaced with new Canvas. Any such stopping event may be captured as a Session Event by Coordinating Server and added to Session Record.

A recording created by Instant Replay may contain similar data as a Session Record, and in fact might, in certain embodiments, be implemented as a nested instance of a Session Record, or as a reference to a portion of the Master Session Record. The Instant Replay recording might be partially or entirely buffered on the User Device, or buffered entirely on a Coordinating Server. User Devices and Coordinating Servers negotiate optimal division of responsibilities based on User Device capabilities such as processor(s), memory, presence or absence of storage device, network interface, geographical location, or other suitable factors.

When a User Device explicitly stops recording through an action initiated by an input device, for example a "mouse click", the event may be sent to a Coordinating Server. Coordinating Server may bundle the action and a reference to the Instant Replay recording as a Session Event and add to Session Record. Global data model may also be updated.

In automatic recording mode, and after a recording is stopped in manual mode, User Device-side Instant Replay App may render to display device: (i) playback controls like play, pause, skip 15/30 seconds forwards or backwards, adjust playback speed to 0.5×, 1.0×, 1.5×, etc.; (ii) clear indicator that the rendered Canvas (or portion thereof) content is from Instant Replay recording as opposed to live. In some embodiments, a split screen may be utilized to show the live session simultaneously with the recorded portion. Further customization of behavior for manual-recording mode might include first rendering a "paused" view of the first timepoint in Instant Replay recording under playback, and another control like a button that ends the playback mode of Instant Replay and returns to the initial mode.

Instant Replay App may often be "nested" within an annotation App like Whiteboard. This allows Annotators to draw over content under Instant Replay.

Actions by User Device to affect playback state of the Instant Replay recording—for example, pausing, advancing, etc. —may be sent to a Coordinating Server and captured as Session Events in the Session Record. Actions by the User Device to annotate Instant Replay recording by means of the annotation App's tools may be processed similarly.

For manual-recording mode, User Device may end playback through an action initiated by an input device, for example a "mouse click". This action may be sent to a Coordinating Server, captured as a Session Event, and added to Session Record. The User Device-side Instant Replay app may return to rendering the live view of Canvas, or portion thereof, as it was rendering initially before recording was started.

Similar to the YouTube Player App, the User Device that instantiated the Instant Replay App—usually associated with the SP (Host)—may choose whether or not other User Devices'—usually Participants'—playback state may diverge from instantiating User Device's. When divergence is allowed, User Devices may progress through Instant Replay recordings at their own pace. They may also re-sync to the instantiating User Device's view of the Instant Replay App.

A User Device composing a Canvas—usually associated with the SP (Host)—can nest an instance of Instant Replay App inside Whiteboard App and/or inside Attention App to allow the Attention Observer to annotate Instant Replay recordings created by either the Attention Observer or the Attention Requester. When Observer grants attention to a Requester, then Observer and Requester may "share" the same Instant Replay control of the Requester's Canvas (or portion thereof). Thus, either Observer or Requester can start, stop, and annotate Instant Replay recordings.

In certain circumstances, many individual non-Observer User Devices may independently create Instant Replay recordings, of their own Canvases or portions thereof, before requesting attention on a recording they wish to be annotated by Observer. After creating the recording the User Device may request attention.

Alternatively, a user composing a Canvas—usually SP (Host)—might choose instead to nest Attention App inside Instant Replay App. In this configuration, attention Observer may have the ability to create Instant Replay recordings of their own Canvas independently of the state of attention grants in Attention App.

Small Group App

Another example of an Interaction App is Small Group, which allows a user (e.g., via the User Device associated therewith)—usually the SP (Host)—to partition other users—usually Participants—into smaller groups in which each group member shares a single Canvas in the manner of an Attention Observer and Requester in the Attention App described above. In Small Group, one or more users may share the same Canvas.

User Device may, in some embodiments, be partitioned automatically by target group size—for example, into groups of at most three User Devices. Alternatively, Controlling User Device may choose to manually partition User Devices. In automatic partitioning, User Devices might be randomly assigned to groups, or additional metadata about "user affinity" might be recorded pre-session to constrain the automatic partitioning. For example, User Device metadata could be created that prevents User Device A from sharing a group with User Device B, or such that User Device C always shares a group with User Device D, for example. If automatic partitioning fails due to unsolvable constraints, Controlling User Device may be required to manually partition some subset of User Devices. As another example, metadata relating to skill level, experience, performance metrics (e.g., score on a quiz administered during the session), or any other suitable data about a User Device or user may be used as a factor in automatic partitioning.

User Device-side component of Small Group App may wish to render representations of sharing User Devices to display device. For example, a "picture-in-picture" box might be shown with avatars and text labels for each sharing User Device, live streams from User Devices' primary video input devices may be shown, or some other suitable representation might be shown.

Actions initiated by any of the sharing User Devices may be sent to a Coordinating Server, captured as Session Events and added to Session Record, and global data model updated accordingly—including to the shared Canvas portion of the data model. Any further events, including notifications of updates to the shared Canvas portion of the global data model, may be sent to all sharing User Devices.

Actions may be initiated simultaneously by multiple User Devices sharing a Canvas. Server-side component of Small Group App may serialize actions by way of Session Events added to Session Record, and resolve global data model into consistent state.

Small Group App may be composed with other Apps, for example by nesting an instance of Attention App inside an instance of Small Group App. In this configuration, any of the User Devices sharing Canvas in Small Group App may request attention of Observer. And when Observer grants attention, Observer sees shared Canvas of sharing User Devices. And sharing User Devices see a representation of Observer, for example as a "picture-in-picture" box as described in Attention App.

Additionally, the User Device-side components of other Apps may be configured to be aware of Small Group App, while other Apps may not need to be aware of Small Group App. For example, Quiz App may have a single canonical data model and representation that all User Device-side components of sharing User Devices can render without ambiguity. Quiz App therefore may not need to be aware of Small Group App.

However, it may be advantageous for Live Stream App to be aware of Small Group App. If an instance of Live Stream App is composed onto Canvas within enclosing Small Group App and parameterized to stream primary video input source, which video source—from which sharing User Device—is selected as primary? Live Stream App may wish to expose an additional control to all sharing User Devices in this situation, allowing any sharing User Device to choose the Live Stream source. (Even in cases outside of Small Group App, there might be ambiguity about which input video sources from a single User Device is "primary" or "secondary" and so on, so such a control might see general use outside of Small Group App.) Live Stream App may also choose a default adaptive policy of showing an input video stream from the "dominant speaker" moment by moment.

Post Session: Replaying Sessions

After live Sessions, users may wish to later play back the recording of the Session, possibly multiple times. To play back a Session, User Device may first send the request to a Coordinating Server. Coordinating Server may then locate a Session Record on storage device and initiate playback.

At a high level, playback may be implemented by Coordinating Server reading the sequence of Session Events from Session Record, re-dispatching Session Events to Server-side components of Apps, updating global data model in return, and/or sending events—including changes to User Device's view of global data model—to User Device much like during live Sessions. User Device may dispatch events to User Device-side components of Apps to effect the same rendering and other updates as during live Session.

Replay of a Session may be implemented simply as an instance of Instant Replay App specially locked into annotation mode as described above in Instant Replay App. Instead of referencing an Instant Replay recording created by Instant Replay App in recording mode, this special instance of Instant Replay might instead reference a master Session Record. Otherwise, all other annotation tools and playback controls may be used.

To navigate a Session Record, playback User Devices may use automatically-constructed indexes of important events from the Session Record. One such index might be represented as a hierarchical table of contents, in which the sequence of contents is derived from the chronology of the Session Record, and the hierarchy is derived from the composition of Apps within Canvases or other structural information. An example table of contents might look like the following:

1. [Title of first Canvas]
    a. Playback of YouTube video X starts
    b. Playback of X seeks to time 10:14.37
    c. Playback of X ends
    d. . . .
2. [Title of second Canvas]
    a. Page 1 in PDF Y shown
    b. Page 2 in PDF Y shown
    c. Instant Replay recording starts
    d. Instant Replay recording ends
    e. Instant Replay annotation added
    f. . . .
3. [Title of third Canvas]
    a. Page 3 in PDF Y shown
    b. Attention requested
    c. Page 2 in PDF Y shown
    d. Attention granted
    e. . . .

Each item in a table of contents may be linked to a timepoint in Session Record by virtue of it representing a Session Event. The playback User Device may for example, by "clicking" on an item, "seek" the Session-Record's playback state to the time of the indexed Session Event. For ease of browsing, hierarchical sections in the automatically-generated table of contents may be expanded and collapsed.

As replay of a Session may be implemented using a Canvas, similarly to a live Session, User Device may be allowed to add new Apps to replay Canvas that weren't composed during live Session. For example, a User Device may wish to overlay a Timer App to limit the amount of time User Device spends practicing a section of a song. In addition, User Device may change the playback state of certain Apps during replay in such a way that playback state temporarily diverges from Session Record. For example, while replaying Session, User Device may choose to seek or repeat a video source replayed by YouTube Player App. Such a divergence might in general "pause" playback of the Session Record. User Device may initiate a "play" action, sent to Coordinating Server, to resume playback of Session Record, in which case temporarily-diverged playback state of YouTube App re-assumes the state it had during live Session at that timepoint.

Playback for the SP (Host) User Device may be granted an additional capability: a control may allow the SP (Host) to assume the view of global state from any Participant in the Session. However, in general, playback for a Participant may not allow the Participant to assume the view of any other User Device from the Session.

Because replay of Sessions will generally re-use the same tools and Apps as in live Sessions, User Devices might choose to record the playback of the original Session Record into another Session Record, including the new divergences from original Session Record, and other actions initiated during playback.

Systems according to aspects of the disclosure thus provide an extensible platform that allows for richer interaction between service providers and their clients. Disclosed systems create an app ecosystem to support content sharing, playback, multi-camera views and various applications to enrich the experience. Service providers should be able to fully run their business through the app. They want an experience that is drastically better than in person. SP capabilities may include choosing apps, choosing what levels of control clients can exercise, access to a dashboard, and practice sessions. Client experiences may include choosing apps, local device optimizations, direct streaming, practice sessions, post-session replay.

Moreover, the recent advent of social distancing has created an opportunity for a first class 1:1 experience for service delivery in areas such as fitness training, music lessons, skill development, and therapy. The experiences provided by the disclosed systems could include: Pre-session: Simple signup, Scheduling, Payments, and/or Pre-work (e.g., questionnaires); In-session: Customized & interactive experience, and/or 1:1 group interaction; Post-session: Practice programs and reminder, Content repository, Shareable tools, Customer development, and/or Tracking of progress.

Systems and methods for providing a remote interactive experience are provided. Systems and methods may include computer executable code stored in a non-transitory memory and run on a processor. The remote interactive experience may be provided via a digital platform.

The platform may include a central server. The central server may include the processor, the non-transitory memory, and/or the computer executable code. The central server may include a network interface. The central server may be partially or fully cloud based. The central server may be distributed across multiple physical or logical entities. The central server may be connected, via the network interface, to a host device and/or to a group of one or more participant devices. The central server may coordinate some or all communication between the devices. The devices may be computing devices, such as laptops, desktops, tablets, smart phones, or any other suitable device.

The platform may receive instructions from a host device to configure a virtual room. The virtual room may be configured to be accessible to the devices.

The platform may receive, from a first participant device, a request to access the virtual room. In response to the request, the platform may render a canvas on a screen of the first participant device. The canvas may include a customizable graphical representation.

The canvas may be configured at least in part based on the instructions of the host device. The instructions may include a selection of one or more interaction apps, from a set of interaction apps, for inclusion in the canvas.

The one or more participant devices may be associated with a level of access. The level of access may be based at least in part on the instructions. The level of access may include a set of rules. The set of rules may define, for each of the one or more participant devices, which interaction apps are included in the canvas. The set of rules may define, for each of the one or more participant devices, which interaction apps the participant device is permissioned to activate. The set of rules may define, for each of the one or more participant devices, a level of permission of the participant device to modify an interaction app.

The interaction apps may include a coordinated window. The coordinated window may be activated by the host device or the first participant device. The coordinated window may be initiated with a layout and a content. The layout may include a size, a shape, and a screen position. The content may include words and/or images that may be displayed within the coordinated window. The coordinated window may be rendered on the canvas of the host device, and on the canvas of the first participant device, with the same layout and content.

When the host device or the first participant device executes an action to modify the layout or the content of the coordinated window, the modification may be applied to the coordinated windows displayed on both devices.

In some embodiments, the platform may receive requests, from other participant devices, to access the virtual room. In response to the requests, the platform may render a canvas on the screens of the other participant devices. When any one of the devices executes a modification action, the modification may be applied to the coordinated windows displayed on all the devices.

In certain embodiments, the content on the coordinated window may include: a pdf file, an image file, a web browser, a shared document with a text editor, or any other suitable content.

In some embodiments, the first participant device may only be permissioned to activate or modify the coordinated window when the host device selects an option to provide the permission.

In certain embodiments, the canvases may be configured to include at least two interaction apps that are video tiles, and at least one interaction app that is a coordinated window. The participants in the remote session may thereby communicate with each other with audiovisual communication while simultaneously collaborating on the content in the coordinated window.

Systems and methods for providing a remote interactive experience are provided. The systems and methods may include computer executable code stored in a non-transitory memory and run on a processor. The remote interactive experience may be provided via a digital platform. The platform may provide management of a shared browser. A shared browser may be otherwise referred to herein as a coordinated window. The shared browser may be shared by a plurality of participant devices. The shared browser may, in certain embodiments, be included as an app in a canvas. In some embodiments, the shared browser may be deployed independently of a canvas.

The platform may store the shared browser in a cloud-based location. The cloud-based location may be a central server. The shared browser may thus be cloud-based. The platform may enable the plurality of participant devices to access the cloud-based shared browser. The platform may receive, as input, actions performed to each of the plurality of participant devices. The actions may include at least one of an action list that includes: a cursor movement, a window-sizing, a window-positioning, and a file navigation, performed to the shared browser. In certain embodiments, the action list may further include an input, a gesture, a document modification, or any other suitable input action, performed to the shared browser. The platform may propagate the actions to the shared browser.

In some embodiments, each of the plurality of participant devices may be associated with a permission level. The permission level may enable the participant device to execute a pre-determined set of actions for propagation to the shared browser.

In certain embodiments, the platform may be configured to coordinate multiple inputs performed on a plurality of separate participant devices. The coordinating may include animating pre-determined actions on the shared browser in order to notify other users that the actions are being performed on a device. The pre-determined actions may include a clicking action, a dragging action, and/or typing.

The coordinating may include providing an exclusive focus for a first-performed action. Providing an exclusive focus may include providing an exclusive browser focus for a pre-determined time period. Exclusive browser focus may prevent other actions from being applied to the browser for the pre-determined time period. Other actions may include actions performed to participant devices other than the participant device to which the first-performed action was performed.

The coordinating may include, during the pre-determined time period, buffering the other actions in a buffer. The platform may apply the buffered actions, in an order that the buffered actions were performed, when the pre-determined time period terminates.

The coordinating may include tracking the state of the browser when each of the other actions was performed. The platform may apply, when the pre-determined time period terminates, the buffered actions, as performed to the tracked state of the browser, to the current state of the browser.

For example, Action 1 on Device 1 may be a first-performed action. Action 1 may, for example, include typing input. Exclusive browser focus may be provided to Device 1 for a time period. The time period may, for example, be 1 minute. The time period may, in another example, be until an event occurs, such as 10 seconds without any typing input from Device 1. Device 2 may perform Action 2 during the time period. Subsequently, Device 3 may perform Action 3, also during the time period. Action 2 may, for example, include a mouse click. Action 3 may, for example, include a navigation input. When the time period concludes, and the exclusive browser focus is withdrawn, the platform may apply Action 2 and then Action 3 to the browser. The mouse click of Action 2 may be applied to a location to which the click was actually performed, even if the location has since moved by the time the action is being applied. Similarly, the navigation of Action 3 may be applied as it would have been based on the state of the browser at the time of performance of Action 3, even if the state of the browser has since changed by the time of application.

The coordinating may include, when the actions comprise a plurality of audio inputs, combining the audio inputs to form a combined audio input. For example, if the shared browser receives audio input, such as a voice command or a singing session, and two or more of the devices receive audio input through their respective microphones, the platform may combine the audios into a single audio file to input to the shared browser.

In some embodiments, the platform may be configured to activate security measures to protect sensitive information from being compromised in the shared browser. The activation may be triggered manually. The activation may, in certain embodiments, be activated automatically. Automatic activation may be triggered by the platform determining that a portion of the shared browser contains, or is associated with a likelihood of containing, sensitive information.

The security measures may include identifying that the sensitive information is accessible in the shared browser and securing the shared browser. Securing the shared browser may include providing an app-level feature that tracks a participant device associated with the sensitive information. When the participant device associated with the sensitive information departs a predetermined location, the platform may terminate access of some or all of the participant devices to the sensitive information. The platform may, alternatively or additionally, notify the participant device associated with the sensitive information that the sensitive information is vulnerable to being accessed by the other user devices.

Departing a predetermined location may include a user associated with the participant device associated with the sensitive information departing a physical location associated with the participant device associated with the sensitive information. Some examples may include the participant device associated with the sensitive information sensing that its user leaves to a location out of camera view of the device, moves a threshold distance away from the device, or moves through a doorway and into another room. Departing a predetermined location may, alternatively or additionally, include the participant device associated with the sensitive information logging out of a virtual room through which the participant devices may be accessing the shared browser.

The security measures may also include receiving a selection of a privacy option on one of the participant devices. The privacy option may be a default setting. In response to receiving the selection, the platform may activate the privacy option on the one of the participant devices. The privacy option may be configured to enable a private portion of the shared browser. The private portion may be visible and/or modifiable only on the participant device that selected the option. The privacy option maybe automatic or manual. For example, the privacy option may be configured to automatically detect a sensitive portion of the browser. Alternatively, a device may be able to request that a certain portion of the browser displayed on its screen be kept private.

The security measures may also include receiving a selection of a security option on one of the participant devices. In response to receiving the selection, the platform may activate the security option. The security option may be configured to prevent actions performed on other participant devices from being applied to the shared browser.

In some embodiments, the security option may be configured to prevent certain actions performed on other participant devices from being applied to the shared browser. The certain actions may include actions to navigate the shared browser away from a page being displayed in the shared browser.

The security measures may also include identifying a sensitive input field on the shared browser. The sensitive input field may, for example, be a field for inputting identifying information (e.g., name, address, date of birth, social security number), financial information (e.g., bank account or credit card information), or other suitable sensitive information. The platform may identify a participant device which initiated the shared browser as a host device for the sensitive input field. The platform may identify a device associated with the sensitive input field as the host, even if that device did not initiate the shared browser. The platform may prevent participant devices other than the host from inputting information into the sensitive input field and/or viewing information inputted into the sensitive input field.

In some embodiments, the platform may be configured to transfer credentials from a local system to the shared browser. The transfer may be executed in response to a selected option. The option may, in certain embodiments, be a default option, and may be executed automatically.

In certain embodiments, the platform may be configured to capture browsing data on the shared browser. The platform may be further configured to transfer the browsing data to a local system. The transfer may be executed via a secure channel. The platform may be further configured to store the browsing data on the local system. The capture, transfer, and/or storage may be executed in response to a selected option. The option may, in certain embodiments, be a default option, and may be executed automatically.

The platform may thus provide for local storage of user data for a web browser, such as a shared browser, running on a cloud service. A typical web browser may save website data for user authentication and/or for persisting a state of the website across multiple website visits.

For a browser, such as the shared browser, running in the cloud it may be desirable to store the data on the user's local computer, instead of in the cloud. Doing so may give full ownership of the data to the user and may eliminate security concerns about storing user data in the cloud. Using a cloud browser may thereby become as secure as the user's local browser.

Websites loaded by a web browser may typically save three types of data—cookies, local storage, and session storage. While a browser is running in the cloud, the data saved by the browser may be captured and securely transmitted on the network to the browser running on the local computer that is presenting the remote browser view. The local computer can then save the data locally in persistent storage. Conversely, when the cloud browser loads a specific website it can request and receive over the network the local data saved in persistent storage before starting to load the website, making the data available to the web site while loading it.

A web browser may present different programming interfaces to the website for storing cookies and local/session storage. For code efficiency, ease of development, and reduced maintenance it may be desirable to present a unified abstracted interface that can be used for persisting this data. Cookies and local/session storage data may, in certain embodiments, be persisted using some or all of the illustrative programming interface presented, along with explanatory comments, in the following paragraphs.

```
    public open( ): Promise <void>
    /*Opens a persistent storage instance and prepares it for operations. On a first
initialization of the persistent storage, it may create the stores for local storage, session
storage, and cookies.*/
       public close( )
       /*Closes the persistent storage instance.*/
       public write(
    storeName: PersistentStorageStoreName,
    origin: string,
    dataKey: string,
    dataValue: string | object,
    ): Promise <void>
       /*Writes the key/value pair for a specific website origin into a named store.*/
       public delete(storeName:
PersistentStorageStoreName, origin: string, dataKey: string):
Promise <void>
       /*Deletes the key/value pair for a specific website origin from a named store.*/
       public clear(storeName: PersistentStorageStoreName,
origin: string): Promise <void>
       /*Clears all data for a specific website origin from a named store.*/
       public readAll(storeName:
PersistentStorageStoreName, origin?: string): Promise
<object[ ]>
       /*Reads all the data for a specific origin from a named store.*/
       public cleanup( )
       /*Removes all stored data from the persistent storage.*/
```

This interface may, in certain illustrative embodiments, be implemented in a modern web browser using a tool such as IndexedDB which may provide asynchronous data storage and retrieval. Since IndexedDB allows querying using a specific key, it may allow fast retrieval of the data for a specific website origin, when the cloud browser requests such data while loading a website.

In some embodiments, the platform may be configured to provide a selectable mechanism, such as a button or icon, on a display of one of the participant devices. Selecting the mechanism may trigger a launch of the shared browser. Selecting the mechanism may trigger transmission of an invitation to other participant devices to access the shared browser.

The mechanism may be embedded in the shared browser. In some embodiments, the mechanism may be embedded in a web-based application that is independent of the shared browser. For example, a website that wants visitors to be able to collaborate (e.g., an artistic or travel booking website) may provide a mechanism for visitors to initiate a shared browser to collaborate on the website with other participants. In still other embodiments, the mechanism may be an independent application installed on a participant device. For example, a smart phone, tablet, laptop, or desktop may have a shared browser application installed. The shared browser application may include an icon on a homepage of the device. Selecting the icon may launch the shared browser. Launching the shared browser may prompt the user for a selection of a content to display in the shared browser. Launching the shared browser may prompt the user for a selection of other participant devices to invite to the shared browser.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement.

The input may relate to a remote educational experience. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server.

The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory. The transmission of the data together with computer-readable instructions may enable the computer system to quickly retrieve the data, when needed. Because the computer system is able to quickly retrieve the data, the web-based server may not need to stream the data to the computer system. This may be beneficial for the computer system, because the retrieval may be faster than data-streaming. Conventionally, streaming data requires heavy usage of the processor and the cache memory. If at least some data is stored in the computer system's memory, retrieval of the data may not require heavy processor and cache memory usage. Any of various conventional web browsers can be used to display and manipulate retrieved data on web pages.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to digital educational platforms.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
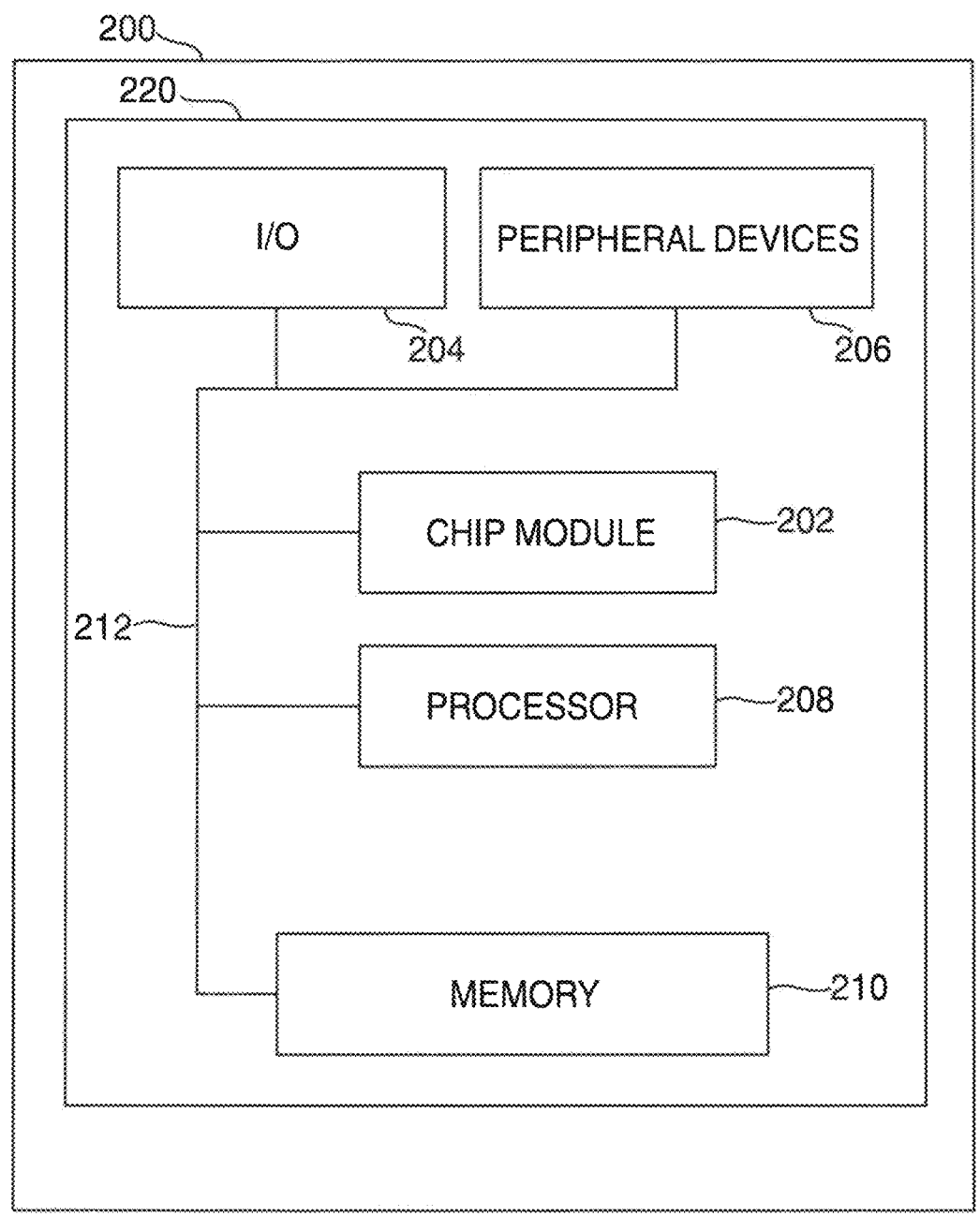
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
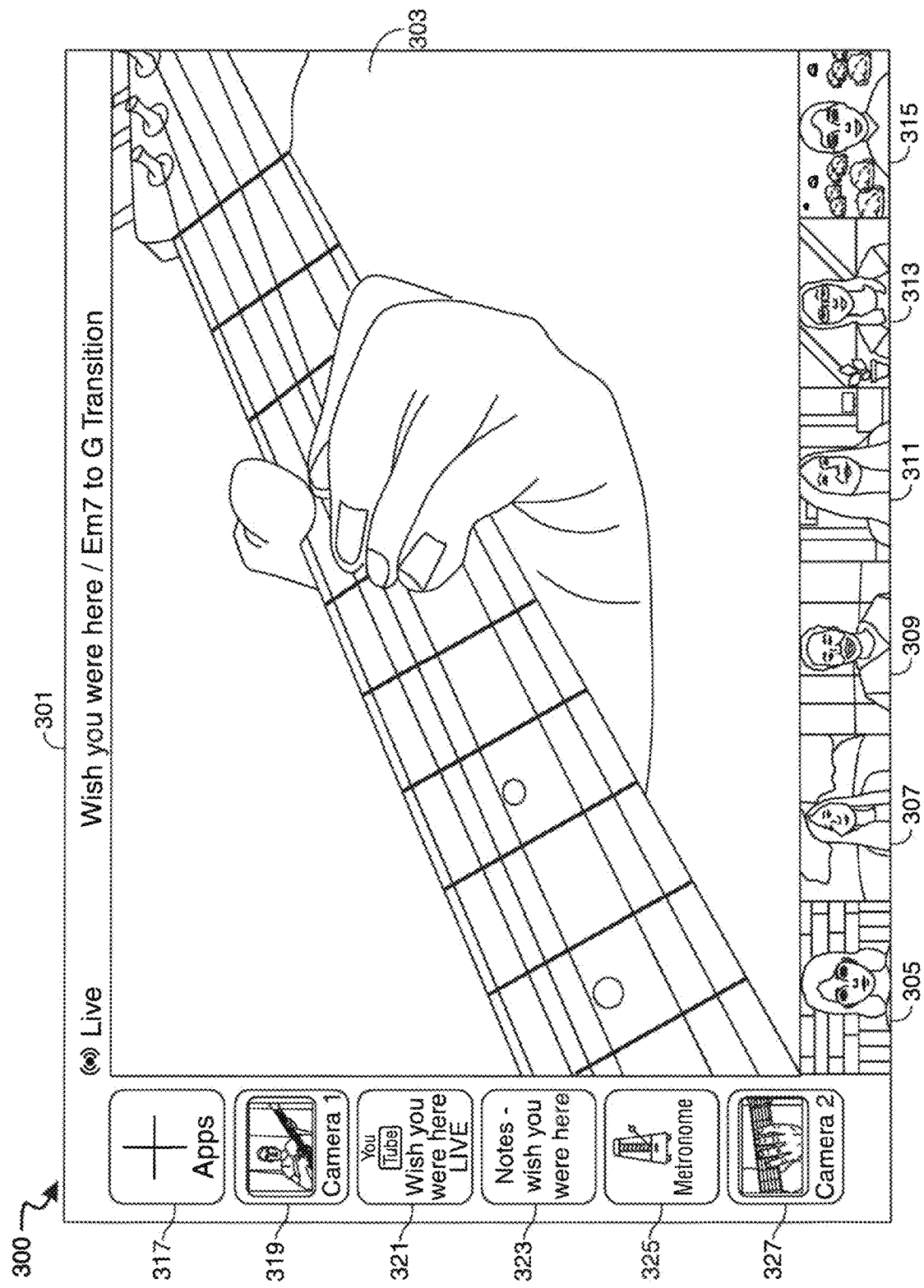
FIG. 3 shows an illustrative screenshot in accordance with principles of the disclosure.

FIG. 3 shows illustrative screenshot 300 of exemplary canvas 301 of an interactive platform according to aspects of the disclosure. Canvas 301 may include background 303. Background 303 may be selected by the host as a background for some or all of the canvases in a session. Background 303 may be a default background. The default background may, in certain embodiments, be automatically selected by the platform based on a session category. For example, the session shown in illustrative screenshot 300 may be a group guitar lesson, and background 303 may be an image of a person playing a guitar. A title may be displayed (shown in screenshot 300 above background 303) which may describe a particular canvas and/or session.

Canvas 301 may include participant icons 305-315. Participant icons 305-315 may include text, avatars, images, or other suitable elements for representing and/or identifying some or all of the participants in a session. Participant icons 305-315 may include video streams of the participants. The video-streams may communicate a live video stream from participant devices. In the exemplary session shown in screenshot 300, participant icons 305-315 may represent video feeds of six participants in the session, who may be six students attending a group guitar lesson. In certain embodiments, one of participant icons 305-315 may identify, represent, and/or show the session host.

Tiles 317-327 may be selectable elements for use in configuring canvas 301 prior to the session and/or during the session. Tile 317 may represent an option to find additional apps. Tiles 319-327 may represent apps already selected and/or available for use in conjunction with canvas 301 as part of the session.

Tiles 317-327 are shown displayed in a column at the left of screenshot 300, and may, in other embodiments, be displayed in other suitable organizational layouts. The layout of tiles 317-327, and some or all of the other elements shown in screenshot 300, may have certain default positionings, and some or all of the layouts may be customizable by the host and/or other user. Customizations may include sizing, ordering, positioning, colors, borders, backgrounds, etc.

Screenshot 300 may represent the view of the host or other user configuring the canvases in a session. The view from a participant device may differ from the view of the host. For example, a canvas rendered on a participant device may not include any of tiles 317-327. A canvas rendered on a participant device may have only some of tiles 317-327 (e.g., communication apps or apps such as record, annotate, request attention, etc.). Furthermore, each participant device may show all participant icons 305-315, or, in some embodiments, may show only the participants aside from the participant associated with that particular device. In some embodiments, each participant device may show only the participant associated with that device. Some or all of the exemplary differences between a host view and a participant view described above, may be customizable by the host and/or the participants.

Figure 4:
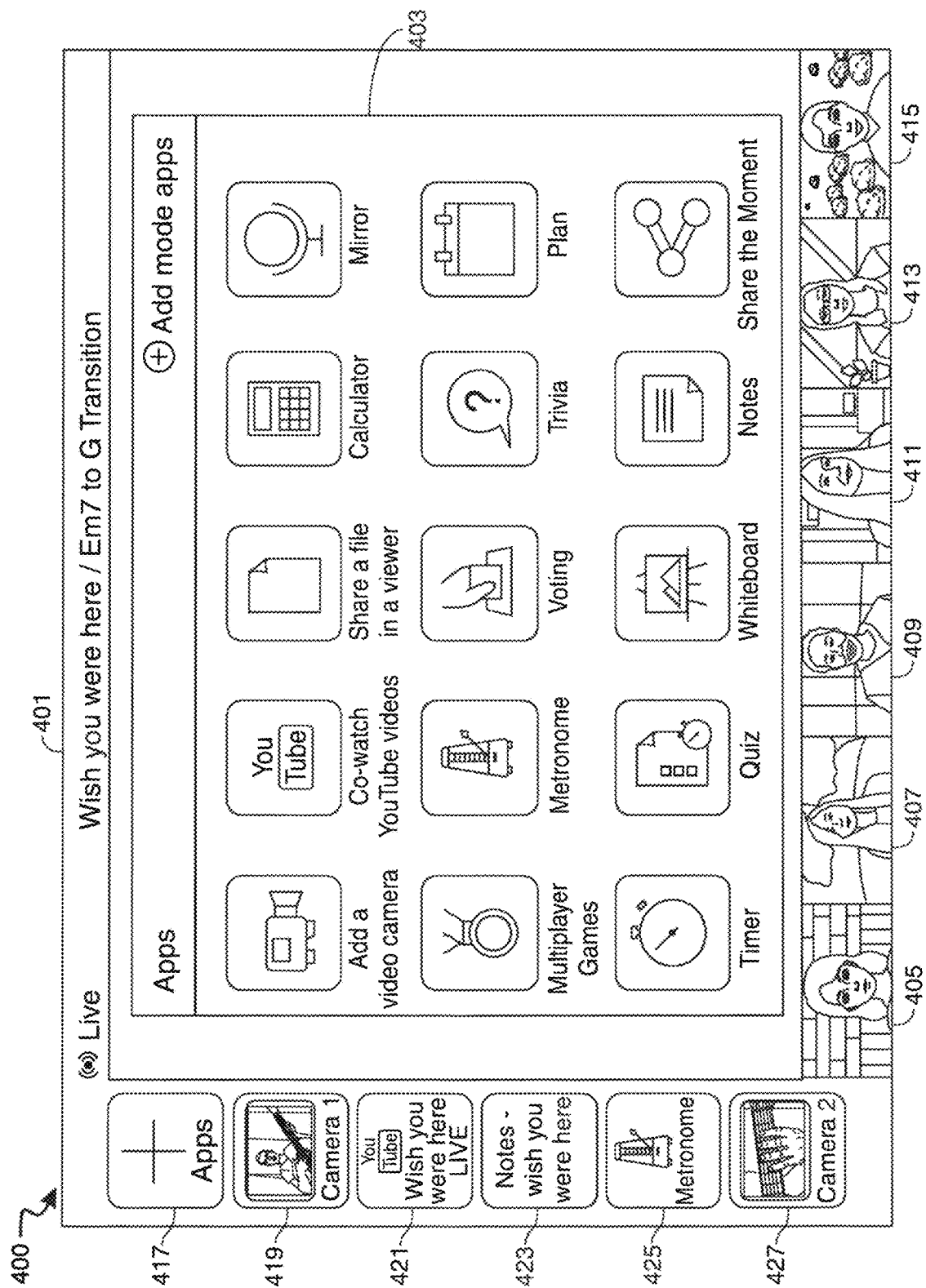
FIG. 4 shows another illustrative screenshot in accordance with principles of the disclosure.

FIG. 4 shows illustrative screenshot 400 of exemplary canvas 401 of an interactive platform according to aspects of the disclosure. Canvas 401 may show further features of a canvas similar to canvas 301. Participant icons 405-415 may correspond to participant icons 305-315 shown in FIG. 3. Tiles 417-427 may correspond to tiles 317-327 shown in FIG. 3.

App menu 403 may present additional apps available for inclusion in the canvas. App menu 403 may be displayed as a result of selecting tile 417. Selecting an app from app menu 403 may include a mouse click and/or drag. App menu 403 may include an option to add more apps (shown in screenshot 400 at the top right corner of app menu 403). Selecting the option to add more apps may scroll down the app menu, link a user to an app store, or provide tools for the user to design a new app.

Figure 5:
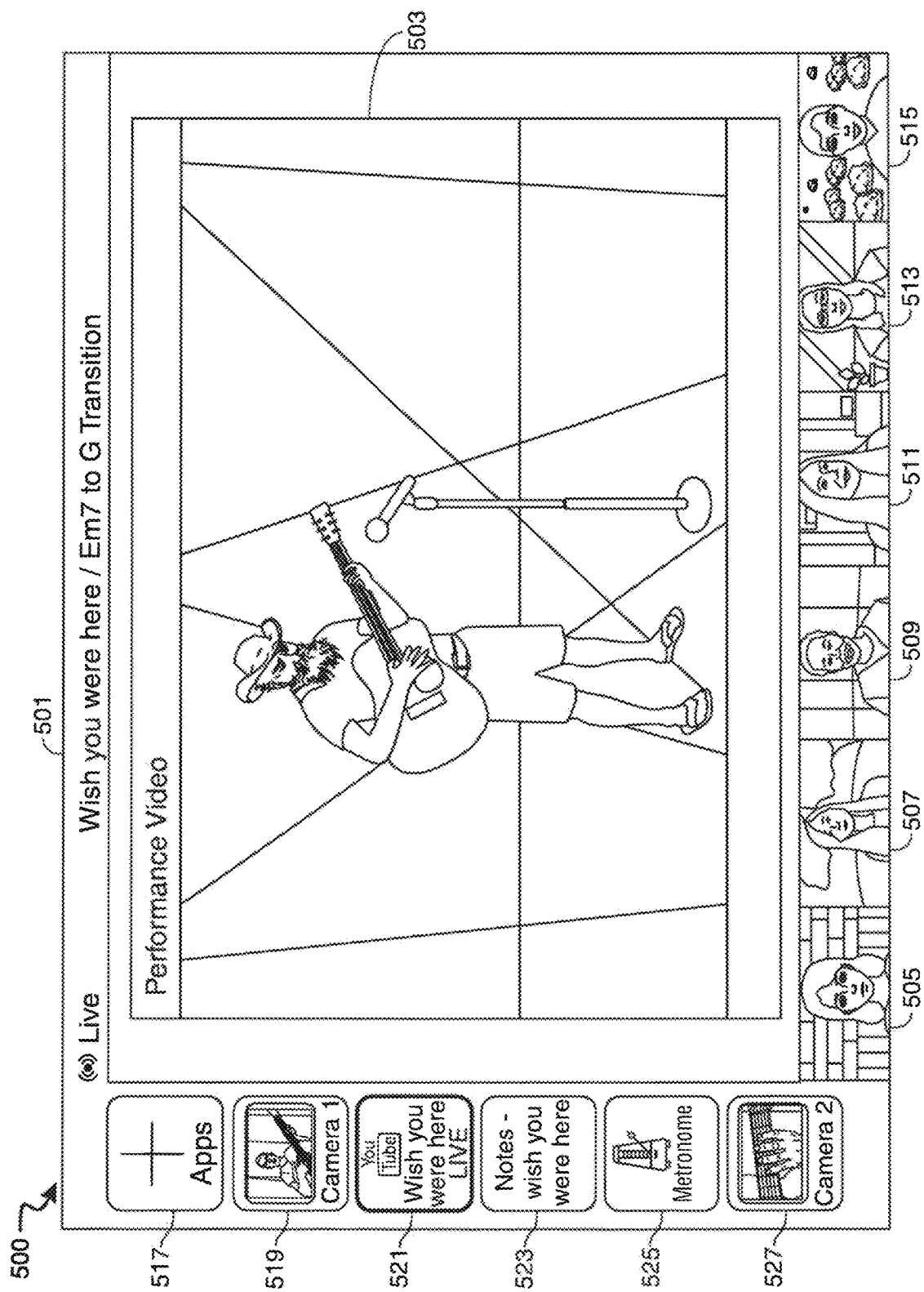
FIG. 5 shows yet another illustrative screenshot in accordance with principles of the disclosure.

FIG. 5 shows illustrative screenshot 500 of exemplary canvas 501 of an interactive platform according to aspects of the disclosure. Canvas 501 may show further features of a canvas similar to canvas 301. Participant icons 505-515 may correspond to participant icons 305-315 shown in FIG. 3. Tiles 517-527 may correspond to tiles 317-327 shown in FIG. 3.

Window 503 may show a video clip or other presentation that the host wants to play for the participants. Window 503 may correspond to the app available via tile 521 in the column at the left of screenshot 500. Canvas 501 may, in certain embodiments, have been pre-configured by the host prior to the session to include window 503. Canvas 501 may be the first canvas in a series of canvases configured by the host for the session. In some embodiments, the host may modify, in real-time, a canvas currently running during a session to include one or more apps such as window 503.

In some embodiments, the presentation of window 503 may be stored on the host device, and the host device may transmit the presentation to one or more of the participant devices for viewing. In other embodiments, the presentation may be stored on a separate server (e.g., accessible at YouTube.com), and the platform may direct the participant devices to access the presentation directly from the separate server. For example, window 503 shown in screenshot 501 may be a video clip of a guitar performance that the host (e.g., a guitar instructor) may wish for the participants (e.g., guitar students) to view during the session (e.g., the group guitar lesson). The video clip may be accessible on YouTube, and the platform may coordinate for the participant devices to access the clip from YouTube at a particular time during the session as directed (in real-time or pre-session) by the host.

Figure 6:
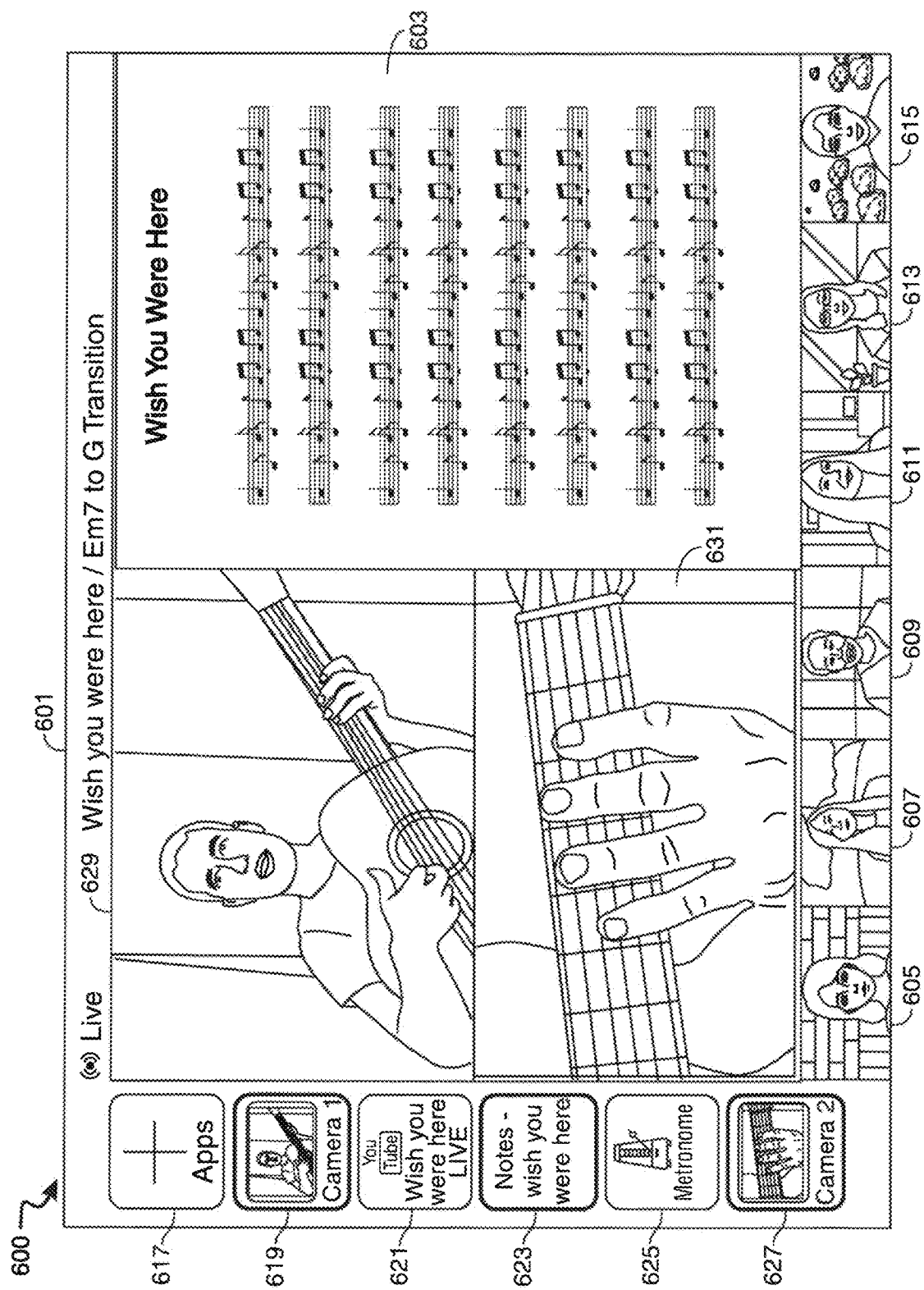
FIG. 6 shows still another illustrative screenshot in accordance with principles of the disclosure.

FIG. 6 shows illustrative screenshot 600 of exemplary canvas 601 of an interactive platform according to aspects of the disclosure. Canvas 601 may show further features of a canvas similar to canvas 301. Participant icons 605-615 may correspond to participant icons 305-315 shown in FIG. 3. Tiles 617-627 may correspond to tiles 317-327 shown in FIG. 3. Canvas 601 may be a new canvas, e.g., a canvas configured prior to a session as part of a series of canvases. For example, canvas 501 may be a first canvas and canvas 601 may be a second canvas.

Canvas 601 may include windows 603, 629, and 631. Window 603 may show musical notes of a song being taught in a session. Window 603 may correspond to the app available via tile 623 in the column at the left of screenshot 600. Window 629 may show a camera feed (live, or, in certain embodiments, pre-recorded) of the host of the session. Window 629 may correspond to the app available via tile 619 in the column at the left of screenshot 600.

Window 631 may show a second camera feed of the host of the session. The camera feed shown in window 631 may be a zoomed-in version of the camera feed shown in window 629, or may show footage from a different camera. Alternatively, the footage shown in window 631 may include pre-recorded diagrams, images, or video. The footage shown in window 631 may, in the particular illustrative example shown in FIG. 6, show a close-up view of finger placements on a guitar, which may be part of an educational experience of the session. Window 631 may correspond to the app available via tile 627 in the column at the left of screenshot 600.

Windows 603, 629, and 631 may have been pre-configured to be included in canvas 601 by the host prior to the session. Alternatively, some or all of windows 603, 629, and 631 may be selected during a session for inclusion in an existing canvas, e.g., to modify canvas 501 and replace window 503.

Figure 7:
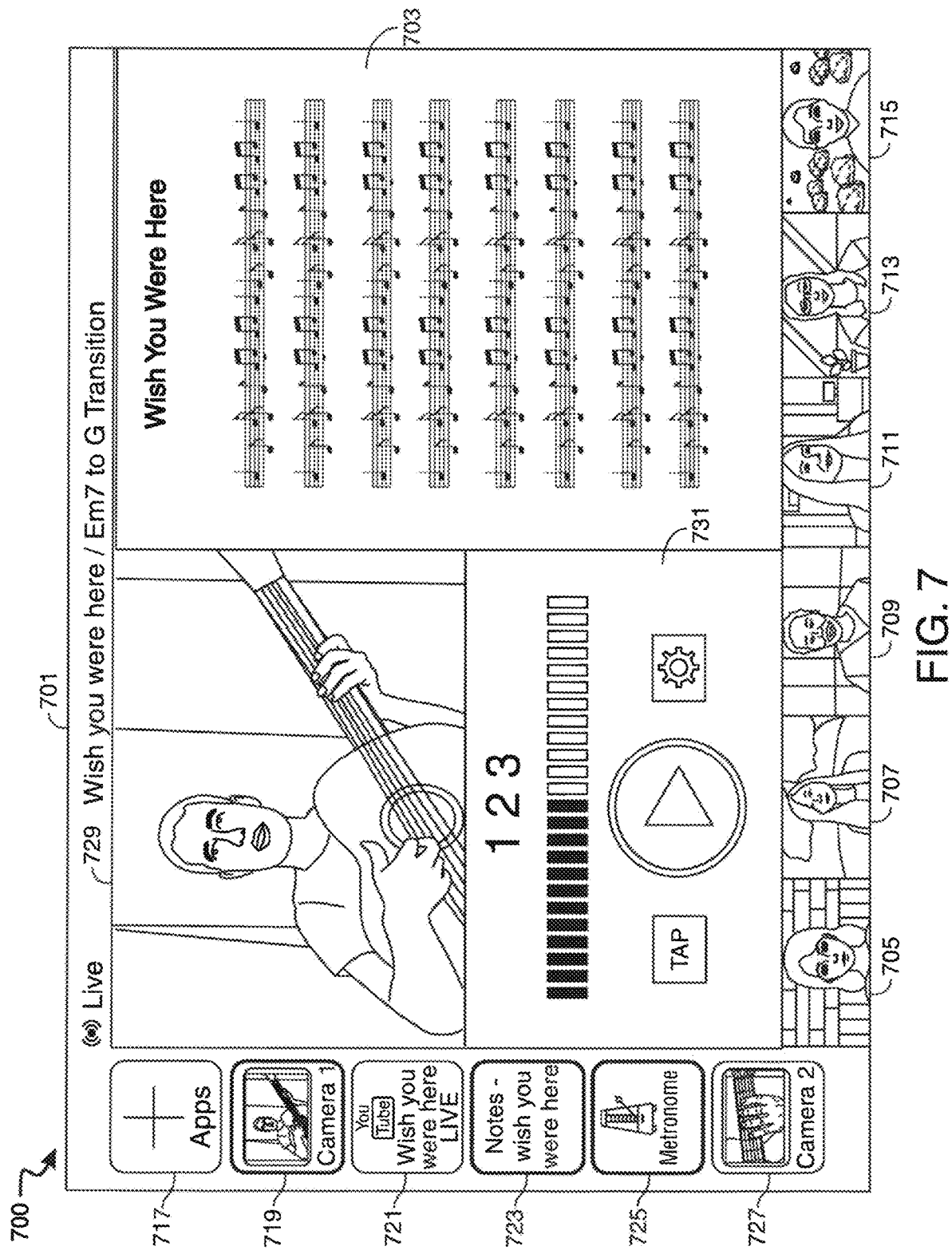
FIG. 7 shows an illustrative screenshot in accordance with principles of the disclosure.

FIG. 7 shows illustrative screenshot 700 of exemplary canvas 701 of an interactive platform according to aspects of the disclosure. Canvas 701 may show further features of a canvas similar to canvas 301. Participant icons 705-715 may correspond to participant icons 305-315 shown in FIG. 3. Tiles 717-727 may correspond to tiles 317-327 shown in FIG. 3. Canvas 701 may be a new canvas, e.g., a canvas configured prior to a session as part of a series of canvases. For example, canvas 701 may be a third canvas preset to be displayed after canvases 501 and/or 601. Alternatively, canvas 701 may be configured during a session as a modification of an existing canvas, such as canvas 601 (e.g., via an action to replace the app running in window 631 with the one running in window 731).

Windows 703 and 729 may be substantially the same as windows 603 and 629 shown in FIG. 6. Window 731 may present an additional musical teaching tool, such as a metronome, or other suitable tool, which may correspond to the app available via tile 725 in the column at the left of screenshot 700.

Figure 8:
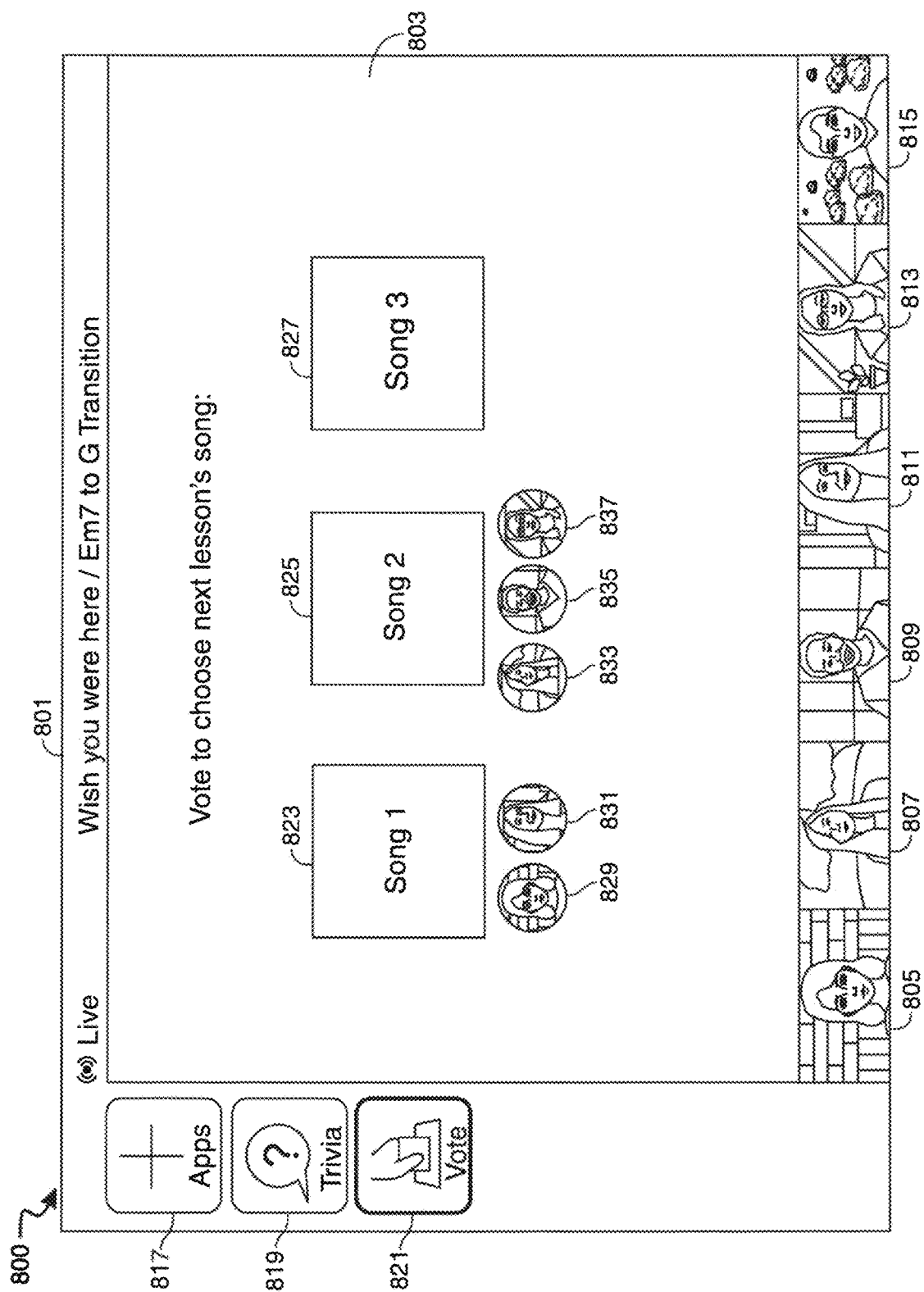
FIG. 8 shows another illustrative screenshot in accordance with principles of the disclosure.

FIG. 8 shows illustrative screenshot 800 of exemplary canvas 801 of an interactive platform according to aspects of the disclosure. Canvas 801 may show further features of a canvas similar to canvas 301. Participant icons 805-815 may correspond to participant icons 305-315 shown in FIG. 3. Tile 817 may correspond to tile 317 shown in FIG. 3. Tiles 819 and 821 may correspond to tiles available in addition to tiles 317-327 shown in FIG. 3. Access to tiles 819 and 821 may be available by selecting tile 817, scrolling down the app column, or some other suitable way of accessing additional tiles which correspond to additional available apps.

Canvas 801 may be a new canvas, e.g., a canvas configured prior to a session as part of a series of canvases. For example, canvas 801 may be a fourth canvas preset to be displayed after canvases 501, 601, and/or 701. Alternatively, canvas 801 may be configured during a session as a modification of an existing canvas, such as canvas 701 (e.g., via an action to replace the apps running in windows 703, 729, and 731 with the one running in window 803).

Window 803 shows a poll that has been included in canvas 801. The poll shown in window 803 may correspond to the app available via tile 821 in the column at the left of screenshot 800. The poll may offer choices, such as choices 823, 825, and 827. The choices may be options for future portions of the current session, for future sessions, or any other suitable options that a host may want to query the participants of the session. In the example shown in screenshot 800, window 803 may present options for a song for a next lesson. The next lesson may be a future session, and the host may use the results in configuring canvases for the next session.

Results of the poll shown in window 803 may include result icons 829-837. Result icons 829-837 may correspond to participants associated with participant icons 805-815, and may be positioned next to the poll option a participant voted for. Window 803 may show that result icons 829 and 831 (which may correspond to participant icons 805 and 811, respectively) voted for option 823, result icons 833-837 (which may correspond to participant icons 807, 809, and 813, respectively) voted for option 825, and no participants voted for option 827. The participant associated with participant icon 815 appears not to have voted in the poll.

Result icons 829-837 may be duplicates of whatever identifier/representation/video may be presented in participant icons 805-815. In some embodiments, result icons 829-837 may be different that the identifier/representation/video presented in participant icons 805-815. For example, if participant icons 805-815 show video feed of each participant, result icons 829-837 may show a name, image, or avatar associated with each participant.

In some embodiments, poll results may be used for a next lesson which may be a later part of the current session. In this scenario, the poll results may contribute to a decision of which canvas to display next. For example, the host may have prepared multiple canvas options and may select one based on the poll results. In some embodiments, the selection may be automatic. The host, when configuring the multiple canvases, may be able to select a setting which maps certain canvases to certain poll results. Thus, when a certain poll option wins, the canvases mapped to that winning option may be automatically presented next. Moreover, a setting may be available wherein whichever participant voted for a certain poll option, is presented with the canvas or set of canvases mapped to that poll option.

Figure 9:
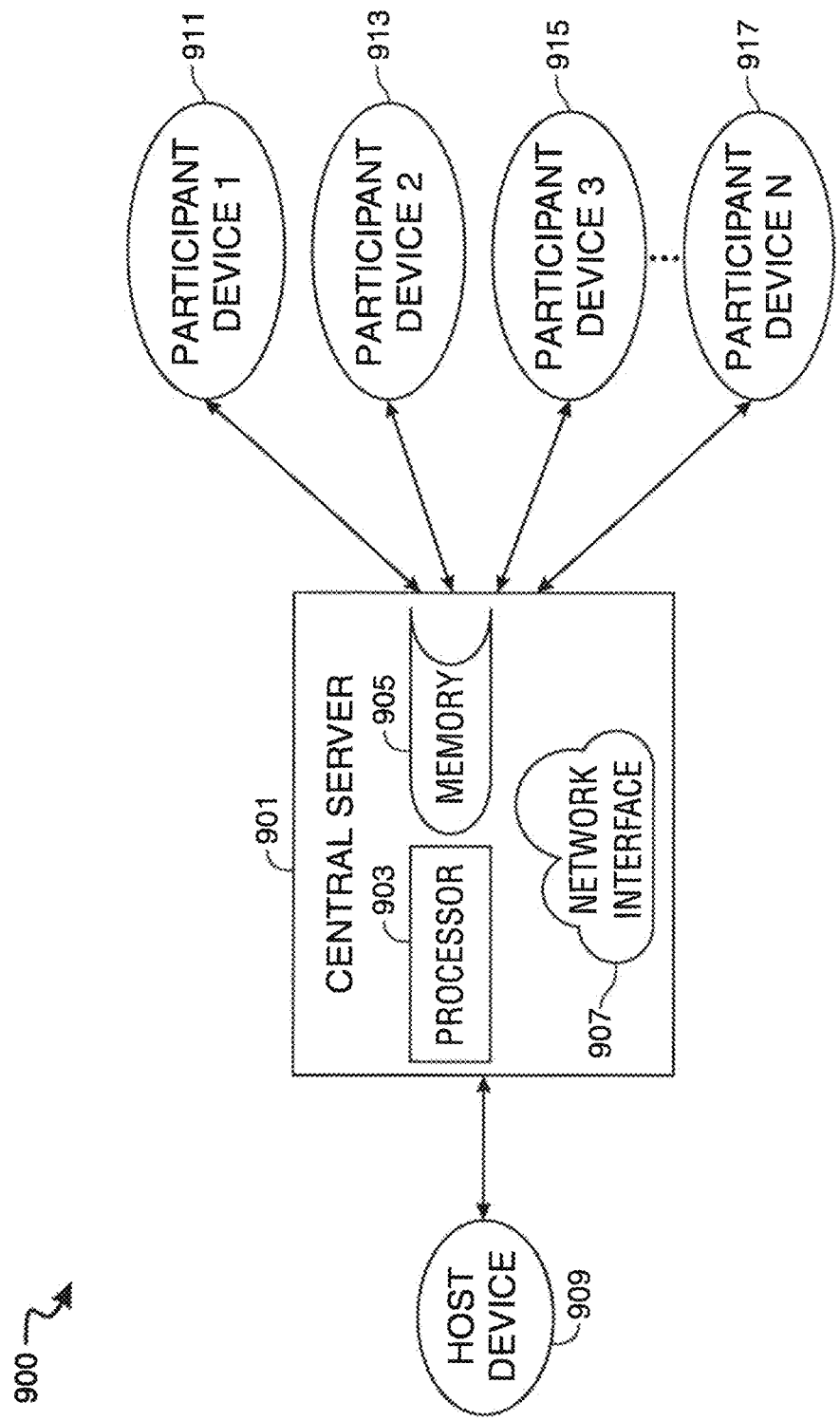
FIG. 9 shows an illustrative system architecture in accordance with principles of the disclosure.

FIG. 9 shows illustrative system architecture 900 of an interactive platform according to aspects of the disclosure. Architecture 900 shows central server 901. Central server 901 may include multiple logical and/or physical servers. Central server 901 may include one or more processors 903. Central server 901 may include one or more memory units 905. Central server 901 may include one or more network interfaces 907. Central server 901 may include and/or work in conjunction with a coordinating server. Central server 901 may include and/or work in conjunction with a content delivery server. Central server 901 may, in certain embodiments, be partially or completely cloud-based.

Central server 901 may be connected to multiple User Devices. The connection between the servers and the devices may be, at least in part, via a network interface of one or more of the servers and/or devices.

A User Device may be a device which may include a processor, memory, network interface, display mechanism, and/or input/output (I/O) mechanism. Each User Device may be associated with a user who may be part of a session facilitated by the platform. Each User Device may be able to configure, display, modify, respond to, and otherwise engage with one or more canvases in an interactive remote session.

One User Device may be host device 909. Host device 909 may be associated with a host user who may have administrative authority. The host user may, in certain embodiments, be a platform subscriber. The host may be able to initiate a session and/or configure canvases. In some embodiments, more than one host device may simultaneously, or sequentially, co-host a session.

User Devices may also include one or more participant devices, shown in architecture 900 as devices 911-917. The participant devices may be associated with participants of the session who are not hosts. In some embodiments, participants may not have authority to initiate a session. Participants may, in certain embodiments, still have authority to configure, respond to, interact with, and/or modify one or more canvases. Participant permissions may, in certain embodiments, be customizable by the host. The host may be able to customize the permissions for all the participants at once and/or individually for each participant separately.

An exemplary session involving a group guitar lesson was detailed above in the screenshots of FIGS. 3-8. In that example, host device 909 may be associated with a guitar instructor, and participant devices 911-917 may be associated with guitar students. The disclosed platform may be useful for any other remote session. Other exemplary educational uses may include math, science, literature, language, standardized test preparation, or any other suitable instruction. The platform may also be useful for book reading and movie viewing groups, recreational and business meetings, and any other imaginable remote session. The disclosed platform may be particularly useful when the session features a presentation and/or includes an interaction.

Figure 10:
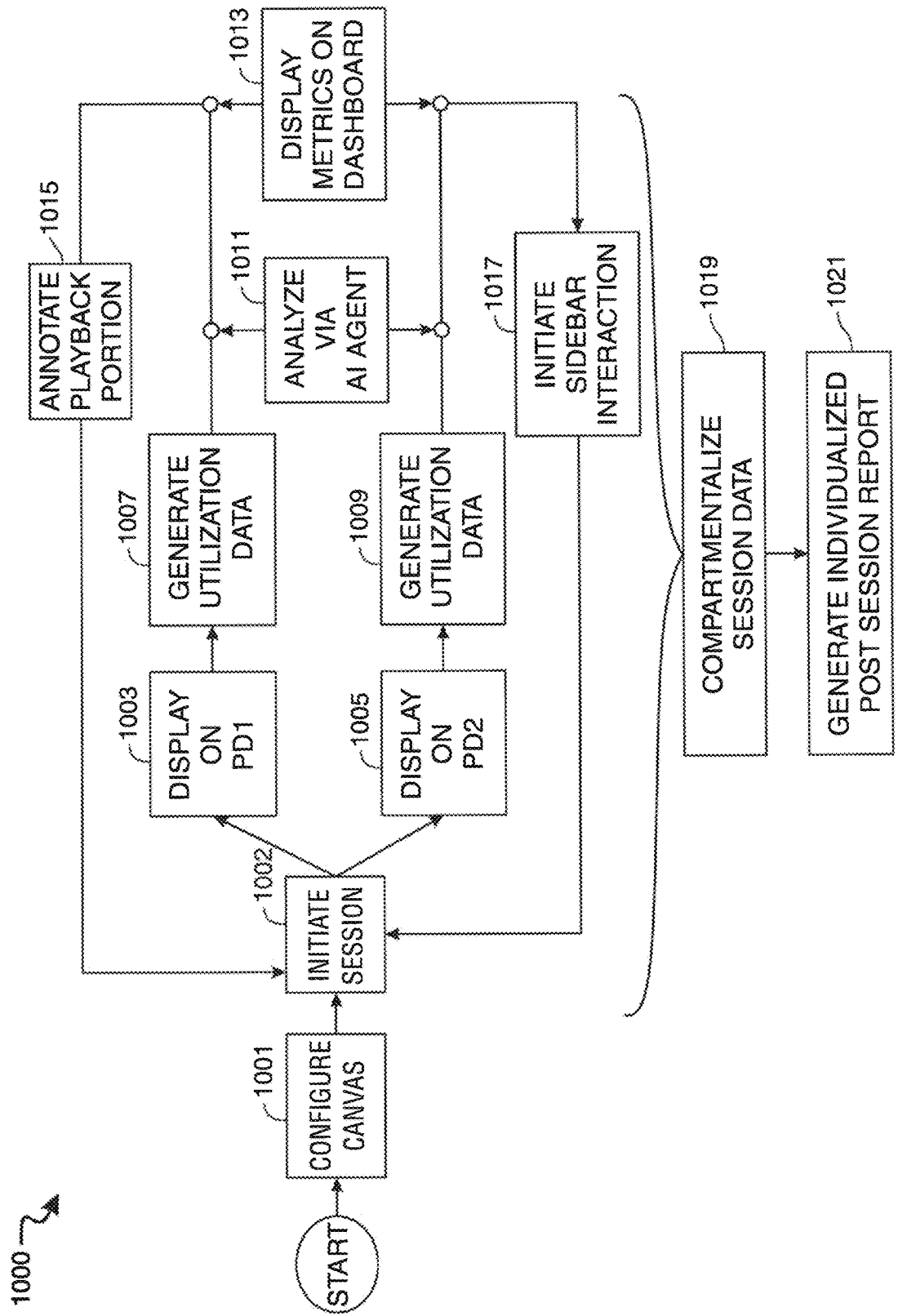
FIG. 10 shows an illustrative flowchart in accordance with principles of the disclosure.

FIG. 10 shows illustrative flowchart 1000 of an exemplary remote multi-stream interactive session on a platform configured according to aspects of the disclosure. Flowchart 1000 may begin when a host configures one or more canvases at step 1001. Configuring a canvas may include selecting content (e.g., one or more apps) and/or content layout on a canvas template for use in a live session. In some embodiments, the platform may provide one or more default preconfigured canvases fully or partially ready for use. In some embodiments, the preconfigured canvases may be generated by an artificial intelligence (AI) component of the platform, and may be based at least in part on historical data that may include prior canvases configured by the host.

The actual live session may be initiated by the host at step 1002. Session initiation may be triggered in real-time by the host, prescheduled by the host to self-initiate at a predetermined time or in response to a predetermined event, or any other suitable initiation process. Once the session is initiated, the platform may transmit an initial canvas for display on one or more participant devices, shown in the exemplary session of architecture 1000 as displaying the canvas on participant device 1 (PD1) at step 1003 and participant device 2 (PD2) at step 1005. Other scenarios may include less or more than 2 participants. Moreover, the canvas displayed on PD1 at 1003 may be different than the canvas displayed on PD2 at 1005. Furthermore, in some embodiments, the host may enable PD1 to modify the canvas displayed on PD1, and/or enable PD2 to modify the canvas displayed on PD2.

The participants may interact or otherwise engage with the canvas in the session. For example, a participant may respond to a poll/quiz, generate video, audio, and/or text-based content (e.g., as a practice or as communication with the host and/or other participants), review and/or annotate a portion of the session, or any other suitable interaction or engagement. In some embodiments, interaction with the canvas may include user activity such as mouse clicks, cursor movements, keystrokes and the like.

The platform may generate utilization data based on the engagements and/or interactions. The platform may, in certain embodiments, generate at least part of the utilization data separately for each participant. Step 1007 shows utilization data gathered for PD1 and step 1009 shows utilization data gathered for PD2.

At step 1011, the platform may analyze the utilization data. The analysis may include artificial intelligence (AI) elements. The analysis may include basic analysis, such as generating a score based on quiz performance. The analysis may also be more advanced. For example, in a scenario where the utilization data includes content created by a participant, an AI agent may score the content.

As a more detailed example to illustrate the steps shown in architecture 1000, an illustrative session the host may be a language instructor teaching a group of participants a language such as, for example, Mandarin. A canvas displayed on PD1 and PD2 may include instructional material, such as a video clip of a person saying "Hello" in Mandarin. One or both of the participants may respond to the instructional material of the canvas by recording an audio or audiovisual clip of themselves attempting to practice saying "Hello" in Mandarin. The practice attempts may be analyzed via AI agents that may incorporate language processing components. The platform may generate performance metrics based on the analysis.

At step 1013, the platform may display the performance metrics on a dashboard. The dashboard may be displayed on the host device. The dashboard may be designed with a streamlined, easy to use interface. Some or all dashboard features may be customizable and/or configurable, e.g., by the host. In some embodiments, the dashboard, or a portion thereof, may be displayed on one or more participant devices.

Steps 1015 and 1017 may represent exemplary actions that may be part of an interactive session. The actions may be activated via one or more apps that may be included in the canvas. One or more of the actions may be generalized across all devices, or may, in certain embodiments, be individualized and directed to one or more devices. For example, step 1015 represents an annotation of a playback portion which may only be activated for PD1. Annotating a playback portion may, in certain embodiments, include an action where the host may annotate a recorded portion of the session, e.g., a recorded practice attempt generated by PD1. The host may, for example, review and annotate the practice attempt based on metrics displayed in the dashboard.

Step 1017 may represent an action of initiating a sidebar interaction. This action may be directed to one participant, e.g., PD2. The sidebar interaction may be a result of a request for attention from PD2. The sidebar interaction may also be initiated by the host in response to metrics displayed on the dashboard. A sidebar interaction may be an individualized communication with the participant, e.g., a video, audio, and/or text-based communication. The sidebar communication may occur in parallel with the primary session, e.g., via a window positioned at a side or corner of the canvas. The window may only be visible on the canvases of the host and the participant who is part of the sidebar interaction.

Further steps of architecture 1000 may include configuring a new canvas, displaying a new canvas, modifying an existing canvas, or other suitable further step.

Step 1019 shows that session data may be collected and/or compartmentalized. Compartmentalized data may include categories, tags, and/or identifiers associated with the data collected. The compartmentalized nature of the data may facilitate generating individualized post session reports at step 1021. The reports may include an event-based summary of the session. The events included in the summary may be individualized based on events that are significant for each participant. The events may be selectable and may enable the user to easily navigate a recording of the session. For example, in the illustrative session shown in architecture 1000, a post session summary may be generated for PD1, and the summary may include an event labeled "annotate playback portion." The user associated with PD1 may be able to select that event and review the portion of the session recording containing that event.

Figure 11:
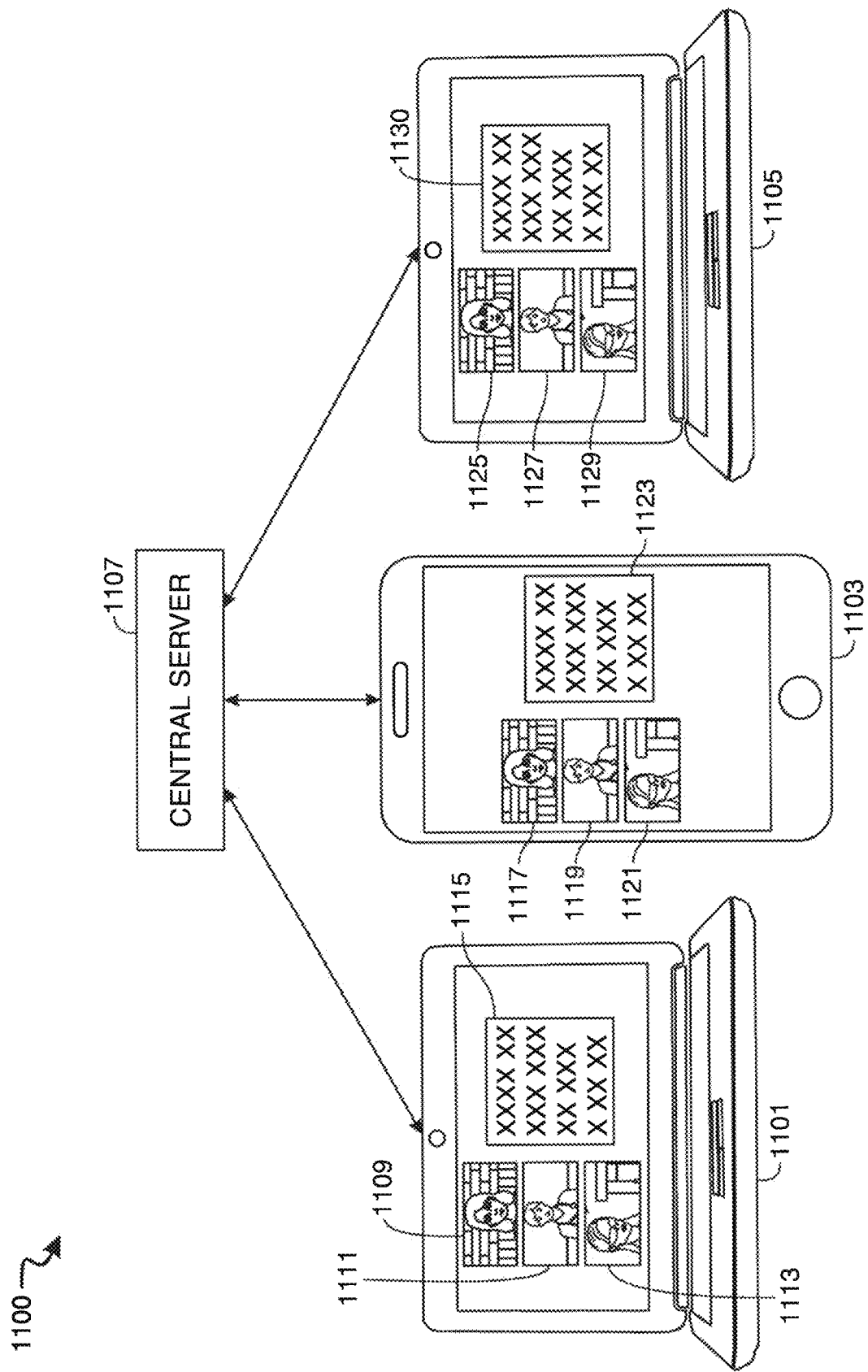
FIG. 11 shows an illustrative system diagram in accordance with principles of the disclosure.

FIG. 11 shows illustrative system diagram 1100 of an interactive platform according to aspects of the disclosure. Diagram 1100 shows participant devices 1101, 1103, and 1105. One of the participant devices may be a host device. Other embodiments may include fewer, or more, participant devices. There may be no limit on the number of participant devices that can access a virtual room for a session. In some embodiments, there may be a system cap on the number of participant devices for security and/or efficiency purposes. In some embodiments, the host device may be able to limit the number of participant devices.

Diagram 1100 shows that the participant devices may be in communication with a central server 1107. Central server 1107 may be cloud based. Central server 1107 may be a coordinating server. Central server 1107 may receive inputs from the participant devices. Central server 1107 may transmit instructions to the participant devices. The instructions may include instructions for rendering a canvas on the screens of the participant devices. Central server 1107 may, in certain embodiments, be configured to coordinate and synchronize the canvases or portions thereof.

For example, the canvas displayed on the screen of device 1101 may include video tiles 1109-1113 and window 1115. Window 1115 may contain a shared document. Window 1115 may contain editable text. The canvases on the screens of devices 1103 and 1105 may similarly include corresponding video tiles 1117-1121 and 1125-1129, respectively, and also windows 1123 and 1131, respectively.

In some embodiments, an action executed on the host device (alternatively, on any participant device that has permission from the host to do so) to modify window 1115, may be applied to the window on the canvases of all the devices (e.g., windows 1123 and 1131). Modifying the window may include resizing, reshaping, or repositioning the window. Modifying may also include navigating about or cropping the content within the window. These illustrative modifications may be supported even when the content within the window is not natively editable. In the example of editable text, images, or other media, edits to the content may also be applied across all the devices. In some embodiments, modifications to the size, shape, and position of video tiles may also be generalized across all the devices in the session. In certain embodiments, the host may be able to customize which apps and features, and which types of modifications, are applied across all devices, and which can be tailored locally for each participant device.

The platform may thereby provide a coordinated and synchronized tool whereby participants can communicate with video and audio, while collaborating on a shared document or other content. The platform itself may augment the document with synchronization capabilities even when the document is not natively a shared document.

Figure 12:
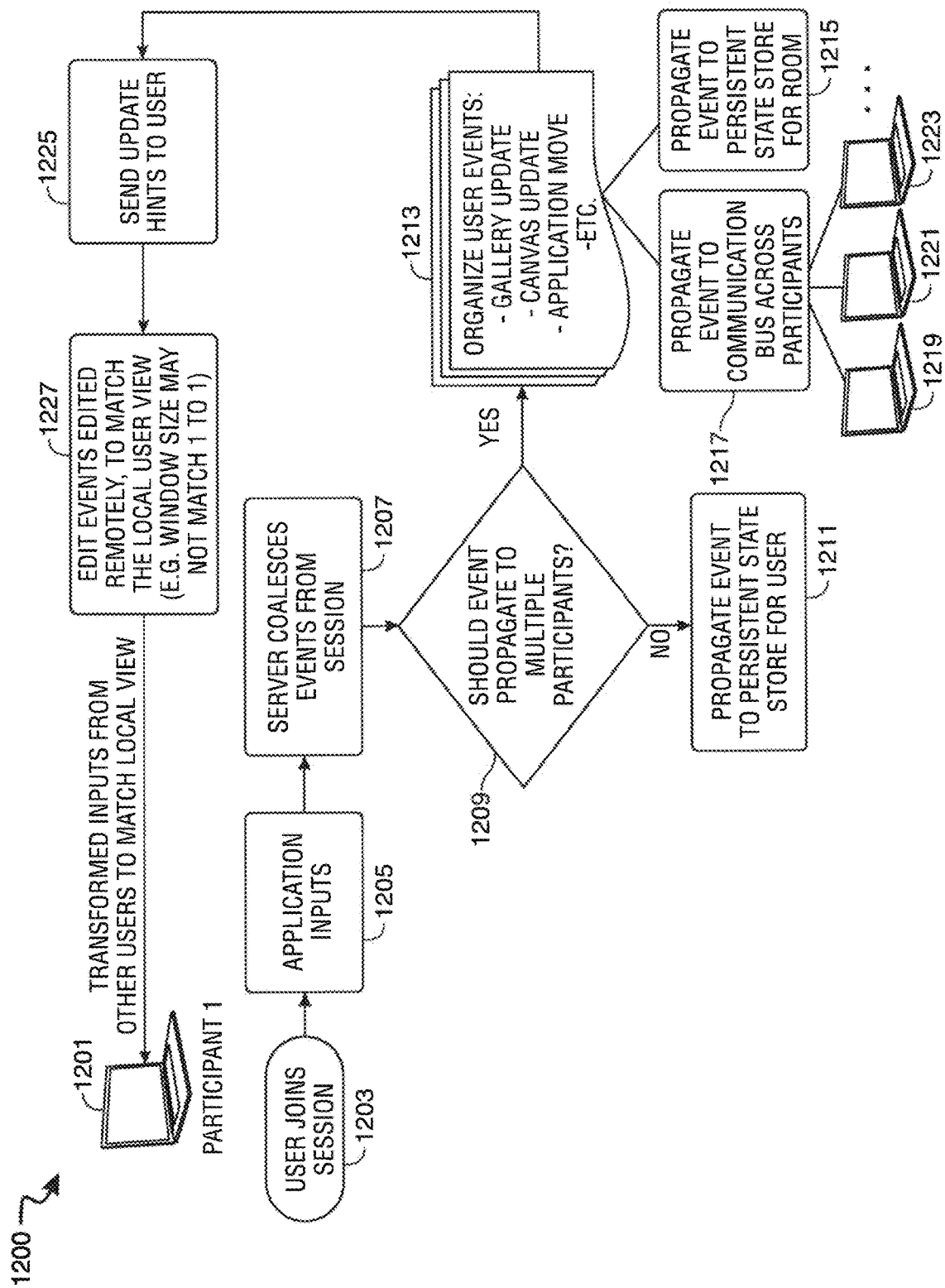
FIG. 12 shows an illustrative flowchart in accordance with principles of the disclosure.

FIG. 12 shows illustrative flowchart 1200 in accordance with principles of the disclosure. Flowchart 1200 shows participant device 1201 that may join a session at 1203. The first participant device may be associated with a first participant. The first participant may, in some scenarios, be the host participant. At 1205 the system receives application inputs. Application inputs may, for example, be executed by the first participant on device 1201. Application inputs may include directions to initiate or terminate an application. Application inputs may include modifications to a size, shape, position, and/or content of an application. At 1207 the server may coalesce events from a session. Events may include inputs. Events may also include updates to an application. The updates may sometimes occur automatically.

At 1209, the system queries whether the event should propagate to multiple participants. This may depend on system settings. The settings may be preset. The settings may be default settings. The settings may have been set prior to, or during, the session by the host. If the event is not to be propagated to other users, the system may propagate the event to a persistent state store for the user at 1211. This may be used as a setting for the current, or future sessions. This may be part of data storage for feedback and replay after a session.

If the event is to be propagated to other users, the system may, at 1213, organize one or more events. These may include updates to size, position, content, etc. The system may propagate the events to persistent state for the room in general at 1215. The system may also, at 1217, propagate the events to a communication bus that will reach other participant devices, such as devices 1219-1223.

At 1225, the system may send update hints to the user. At 1227, the system may edit events edited remotely, to match the local user view. For example, if a different user with a different window size (e.g., that user is on a tablet or a phone, and the current user is on a device 1201, a laptop computer) executes a modification that is to be propagated across all devices, the current device may transform those modifications to match the local view.

Figure 13:
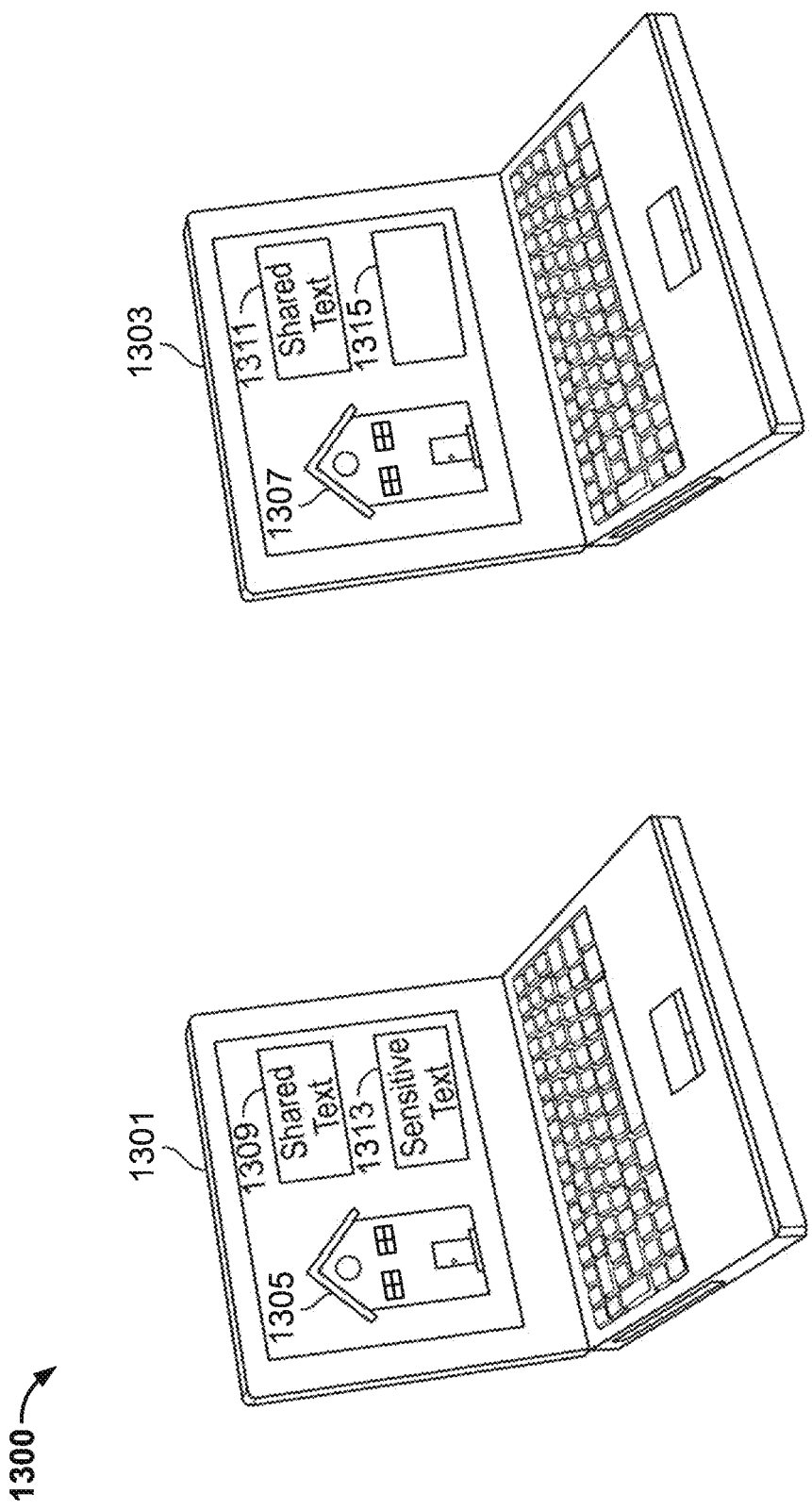
FIG. 13 shows an illustrative system diagram in accordance with principles of the disclosure.

FIG. 13 shows illustrative system diagram 1300 in accordance with principles of the disclosure. System diagram 1300 shows participant devices 1301 and 1303. The devices are shown participating in a remote collaborative session. The screens of the devices are displaying a shared browser. The shared browser may be showing identical content on the two devices, including image 1305 and corresponding image 1307, and text 1309 and corresponding text 1311. However, system diagram 1300 also shows a portion of the shared browser which may be in a privacy or security mode. Text 1313 may be associated with sensitive information that may be associated with device 1301. Accordingly, the platform may (automatically or in response to a request) prevent that sensitive information from being shown (or, in some embodiments, from being modified) in corresponding text field 1315 on device 1303.

Figure 14:
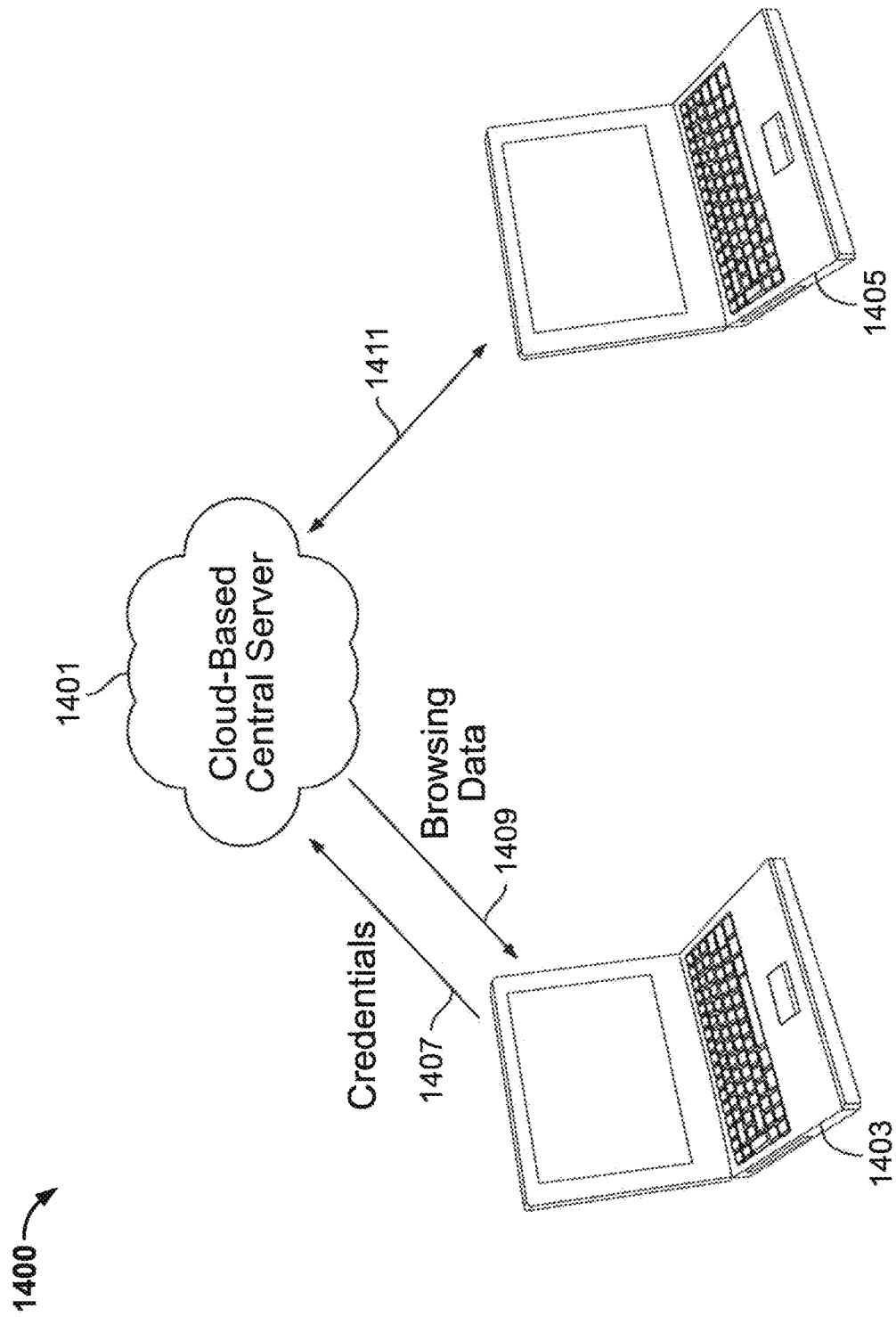
FIG. 14 shows an illustrative system diagram in accordance with principles of the disclosure.

FIG. 14 shows illustrative system diagram 1400 in accordance with principles of the disclosure. Diagram 1400 may include central server 1401 and participant devices 1403 and 1405. Diagram 1400 illustrates that device 1405 may be connected to server 1401 with two-way connection 1411. The two-way connection may allow for uplink and downlink so that device 1405 can receive updates to the shared browser and transmit actions of its own back to the shared browser. Device 1403 is further shown with uplink 1407 and downlink 1409. Uplink 1407 may transmit credentials to the central server. Downlink 1409 may receive browsing data for local storage at device 1403. Uplink 1407 and downlink 1409 may be encrypted, secure, channels.

Figure 15:
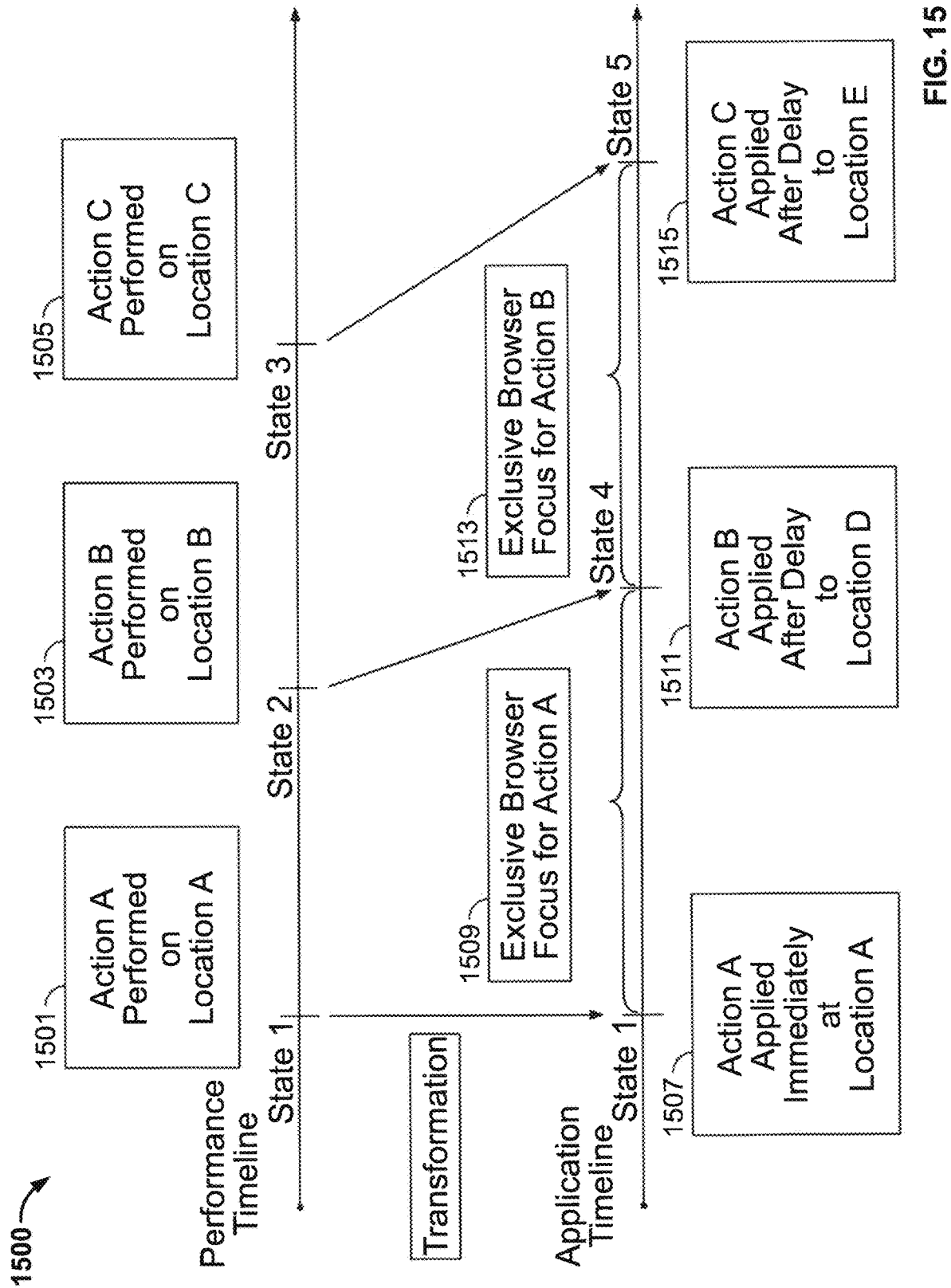
FIG. 15 shows an illustrative system diagram in accordance with principles of the disclosure.

FIG. 15 shows illustrative system diagram 1500 in accordance with principles of the disclosure. Diagram 1500 shows some of the mechanisms for coordinating actions performed on different devices for the shared browser. Diagram 1500 shows a performance timeline including: Action A performed on Location A when the browser is at State 1 (1501); Action B performed on Location B when the browser is at State 2 (1503); and Action C performed on Location C when the browser is at State 3 (1505). As an example, Actions A and B may be typing inputs and Action C may be a mouse click. Actions A-C may be performed on different participant devices.

The platform may implement a transformation in actually applying Actions A-C to the shared browser. Diagram 1500 shows an application timeline including application of Action A to Location A when the browser is at State 1 (1507). Because Action A is first, it may be applied immediately, and the browser may typically be in the same state at application as it was when the action was performed. The platform may then apply exclusive browser focus for Action A (1509). The exclusive focus may extend until the browser is at State 4, which may be after State 2 (the state at which Action B is performed). As a result, Actions B may be buffered. The platform may apply Action B at State 4 (1511). However, Action B may be applied to Location D, even though it was performed on Location B, because the platform may compute that Location B at State 2 may be equivalent to Location D at State 4 (e.g., the content in the screen may have shifted or been scrolled). The platform may then apply exclusive browser focus for Action B (1513). The exclusive focus may extend until the browser is at State 5, which may be after State 3 (the state at which Action C is performed), so Action C may also be buffered. When the exclusive focus is lifted at State 5, buffered Action C may be applied (1515). Action C may be applied to Location E, even though it was performed on Location C, because the platform may compute that Location C at State 3 may be equivalent to Location E at State 5. Because Action C is a mouse click, exclusive browser focus for Action C may be shorter than that provided for typing inputs, or, in certain embodiments, nonexistent.

Another aspect of the invention relates to forms of heightened levels of collaboration. When collaborating with a team through an online shared workspace, multiple modes of collaboration are required to create an experience that is as successful as working with a team within a physical room. For example, each team member requires a personal context associated with their respective individual identities. This may be needed for attributing edits to the editor with whom the edits are associated, maintaining a sense of identified presence, and other suitable personal context related characteristics. This experience may be referred to in certain embodiments as "multiplayer".

In certain embodiments, team members are able to adopt others' contexts when needed to review the team members' work in real-time and consult on questions, simultaneously edit in real-time, and more. In legacy systems, some level of edit attribution may be lost for the reviews—when the reviewer's revisions take place in another member's context. This loss of edit attribution may be sacrificed in exchange for finer-grained, richer, real-time collaboration. This experience may be referred herein to as "following".

It is desirable for a presenter to be able to present his or her view of the collaborative workspace to many other team members. It is, therefore, important that all team members adopt the same context during the presentation so that the presenter can narrate the content—and team members can ask questions—with confidence that everyone substantially simultaneously sees the same view. A sense of identified presence of the non-presenting team members can be maintained during presentation, while collaborative editing may not be desired. This experience may be referred herein to as "presenting".

No fully-shared workspace exists that implements all of the multiplayer, following and presenting aspects in real-time as presented above.

The following disclosure describes methods and apparatus that preferably fully implements all three features for shared online workspaces. The shared workspaces encompass many applications, preferably none of which individually need be aware of the instantiation of the apparatus within which they are contained.

The method and apparatus are also preferably agnostic to whether individual applications run co-located with a user's local terminal, or whether they run on remote application servers.

The following system overview details exemplary system components according to the current disclosure.

The components may include (it should be noted that the following definitions of component terms represent exemplary definitions, or partial comments relating to accepted definitions of, these terms according to the current application):

Local Terminals. Typically each local terminal is associated with one per user.

Application Servers. Servers may be co-located with users' local terminals, or be hosted on remote servers accessible through the Internet.

Coordinating Servers, or Coordination Infrastructure. Coordination Infrastructure can be used to manage collaborative workspaces, negotiate users' connections to application servers, maintain user presence, and more. In other words, coordination infrastructure coordinates users, workspaces, and applications. One, more than one or many individual server instances may comprise the infrastructure.

An application is an external program preferably, but not necessarily, purpose-built for users to view, discuss, and possibly edit shared resources. Familiar applications include document editors, spreadsheet editors, accounting software, and even any website addressed by a URL that a user has authorization to access. More formally, an application can be described by:

Resource Identifier. Identifiers can be application dependent. For web apps, most shared resources can be described by HTTP URLs. For a document editor application, a shared resource might be described, for example, by a file path on a shared network volume;

Application Instance. The memory image, disk storage, and other state—across multiple machines—that enable users to view, discuss, and edit resources. An Application Instance may be co-located with a particular user's local terminal, or it might reside in a remote application server or even in multiple servers;

Application View. A stateful or stateless stream from the application instance to users' local terminals including bitmap graphical resources, graphical commands like 2D vector or 3D rendering, and/or non-graphical-media like audio from a "screen reader" that preferably enables a user to visualize the current state of the application instance;

Application Control. A stream of events and other data that are sent from the user's local terminal to the application instance, and, in effect, may change the state of the application instance and/or its application view; and Workspace. A configuration that describes an arrangement of a collection of applications. A well-known "single player" workspace is an operating system desktop.

In certain embodiments, a workspace becomes collaborative because it is shared between multiple users. In other words, multiple users are presented with the same arrangement and collection of applications.

According to the embodiments set forth herein, each user can be given its own personal context on or within a collaborative workspace. Thus, for each application arranged and collected on the workspace, each user has its own application instance, usually, but optionally, associated with the user's identity. This allows each application instance to attribute edits to the user, communicate the user's presence through application views, etc.

Furthermore, each user's application instance has an application view, and application control, that is preferably private to the user by default.

While the view and control of each instance are private to their owning user, the private application view may include avatars or other representations of other users' contexts from the other user's application instances. A document editor application may show, for example, an avatar of each collaborating user in the top-right, and a visual representation of each user's cursor position within the shared document itself.

In one example of the foregoing, a first user A can invite another user B to "follow" user A's view of the collaborative workspace. In such embodiments, and for the purposes of this application, follow operations can be understood to refer to:

A's view of the collaborative workspace preferably does not change, except to include a visual indicator of the switch into "follow" mode and of B's shared view. This can include, and is not limited to, a visual avatar of B, a representation of B's mouse position, keyboard cursor, and/or other suitable visual indicator(s);

B's view of the collaborative workspace becomes substantially identical to A's, as described in more detail in the paragraphs below. It should be noted that in some embodiments, once A selects B to follow A-B may follow A without A inviting B, other than to instruct B to follow, or consenting to such an operation in which B follows A. Some embodiments, however, may require that B consent to such an instruction from A prior to B's following A.

For each application collected and arranged on the collaborative workspace, B's local terminal preferably updates to show:

The application view from A's application instances, instead of B's;

The application control from A's application instances, instead of B's—i.e., that the application control of A's application instances has now become shared by the explicit action of A inviting B to follow; and In certain embodiments, B's local terminal may still show a different view of the collaborative workspace than A because of personalization of A's view to A and B's view to B, respectively. This preferably includes, but is not limited to, different views of avatars, different labeling of the shared view of cursors, or other suitable personalizations.

For each user U, the logic below determines which app instances to display in the collaborative workspace with its current view for U:

The following exemplary code corresponds to an actual implementation according to embodiments of the invention.

```
const RenderApps: React.FC<{
    canvas: CanyasDisplayItem;
    followingUser: string | null;
    username: string;
}> = React.memo(({canvas, followingUser, username }) => {
    const isDebugModeEnabled = renderState.useSelector((state) =>
        state.debugModeEnabled);
    const multiplayerBrowserEnabled = renderState.useSelector((state) =>
        state.multiplayerBrowserEnabled);
    const isMultiplayerModeModeEnabled = isDebugModeEnabled &&
        multiplayerBrowserEnabled;
    return (
        < >
        {canvas.apps.map((clientId) => {
            const [
                ,
                {
                    app: { __typename: appType, createdByUser },
                    app,
                },
            ] = inMemorySessionState.actions.locateAppData(clientId)!;
            if (app.__typename === 'BrowserMonarchApp') {
                const { participantId, parentParticipantId, isMultiplayerMode } =
                    app;
                if (
                    (!isMultiplayerModeModeEnabled && isMultiplayerMode &&
                    parentParticipantId) ||
                    (isMultiplayerModeModeEnabled &&
                        isMultiplayerMode &&
                        ((followingUser && followingUser !== participantId) ||
                    (!followingUser && participantId !== username)))
                ) {
                    return null;
                }
            }
            return (
                <AppContainer
                    canvas={canvas}
                    key={clientId}
                    clientId={clientId}
                    createdByUser={createdByUser}
                    appType={appType as AppName}
                    app={<App clientId={clientId} appType={appType} />}
                />
            );
        })}
        </>
    );
});
```

As described above, one user A can present its view of the collaborative workspace to "many" users—usually all other users connected to the collaborative workspace. More specifically, this means that:

A's view of the collaborative Workspace does not change, except that visual indicators of the switch into "Present" mode and visual indicators of the users being presented to may be shown. This might include, but not be limited to, For each app instance A associated with user V:
    a.        Is A fully-shared app (for the purpose of this application - a fully-shared app may be understood to refer to an app that is designed, in its native form and independent of additional software or hardware, to provide instances which can be used by multiple participants)?
        i.        → render to display within View
    b.        Else:
        i.        Is U following V or V presenting?
            1.        → render to display within View
        ii.       Else:
            1.        Does U == V and U is not following another user and no other user is presenting?
                a.        → render to display within View visual avatars of other users, representations of their respective mouse cursors, and/or other suitable visual indicators.

For all users being presented to, their view of the collaborative workspace becomes similar to A's. For each user being presented to, and each application collected and arranged on the collaborative workspace, the user's local terminal updates to show:

The application view from A's application instances, instead of the user's;

In some embodiments, the full application control from A's application instances will not be given to the user. Instead, the user may be given a limited, "read only" control in which they can move around a mouse pointer, for example, but not mutate any content within the application view. It should be noted that delivering limited control is optional—full shared application control may be granted instead. In some embodiments, the full application control from A's application instances will (or can) be given to the user.

Even after partial control, or full control, has been shared, the user's Local Terminal may still show a different view of the collaborative workspace than A because of personalization of A's view to A and the user's view to the user. This may include, but preferably not be limited to, different views of avatars, different labeling of the shared view of cursors, etc.

Additional implementation complexity resides within the <AppContainer> component and subcomponents in the code above. Those are where app display and control streams (if allowed) are created and maintained. In addition, there is code to synchronize the actual view on the collaborative workspace to each exemplary user U from the user V who is presenting (or whom U is following). An exemplary <AppContainer> component and subcomponents and the code to synchronize the actual view on the collaborative workspace to each exemplary user from the user who is presenting is found in Appendix A.

The foregoing multiplayer, follow and present modes represent specific, common-case collaboration modes. A more full enumeration of possible modes is enabled by the disclosed methods and apparatus and may be configured for particular use cases, such as the use cases set forth below:

Any user can invite any subset of other users to follow the user's view of the collaborative workspace. Any user can invite any subset of users to whom to present. In certain embodiments of "follow" and "present" the methods and apparatus may preferably utilize the same underlying technical machinery, albeit for different target user(s).

More particularly, in the user interface according to the embodiments, the difference between follow and present may be understood to be as follows:

Follow: one user A clicks another user B's avatar to enable A to see B's view (and/or share control) of the shared workspace. In some embodiments, A shares control of B's apps as well. In others, A may not share control of B's apps. In yet another embodiment of "Follow", B can click A's avatar to enable A to see B's view (and/or share control) of the shared workspace. Permutations of the follow command other than those stated hereinabove are possible and within the scope of this disclosure.

Present: one user A clicks a dedicated "Present" button, and all other users in the shared workspace are shown A's view of the shared workspace. None of the other users have control of A's view. The users may, in certain embodiments, be selected by the presenter.

A plurality of such "follow" and "present" sessions may run concurrently within the same collaborative workspace, among various subsets of users.

One user following another (being presented to) may be granted no application control, partial application control or full application control. Partial application control may include any subset of the application control between (and/or including the endpoints) no control and full control.

When a follower/presentee connects to the followee/presenter's workspace applications, either the system and/or the followee/presenter can choose whether or not to also connect follower/presentee to the control interface.

In a follow or present session, the full collection, or some subset, of applications on the collaborative workspace may be followed/presented, or only a subset thereof.

Embodiments can be configured to follow/present all of the multiplayer applications. However, when a list of applications to be followed is enumerated at the point of connecting a follower to a followed, and a presenter to a presented, application state, only some subset of those applications can be selected based on system-set rules that can be defined.

Follow and present sessions might be entered into by explicit user request, or triggered by other, possible system-set, mechanisms.

Timer trigger: at the beginning of a meeting, all members of a workspace are given 10 minutes to review documents and media that describe the background and agenda for the meeting. Each member can review the content within their own personal context, at their own pace. At the end of the 10 minutes, all members automatically enter present mode following the meeting lead who then carries on with the agenda.

External event trigger: a "war room" shared workspace is created to investigate a system outage. The workspace is configured to receive pagerduty alerts. Pagerduty, a software incident response platform, is only one example of a service that could be used in this scenario. When a new alert is received, all workspace members automatically enter present mode following the war room lead. This forced context switch brings the attention of all members to the new alarm.

External link/invitation: a bot according to the current disclosure is integrated into an #engineering Slack™ (or other suitable application) channel. Users A and B are members of the channel.

User A has been editing and reviewing content within a shared workspace according to the current disclosure, in which B is a member but not present. User A "invites" user B to follow A in the shared workspace, and this triggers a Slack™ notification in the #engineering channel. User B clicks a link in the Slack™ notification, joins the shared workspace, and follow mode is automatically initiated for B>A—i.e., B follows A.

Application instances of users within a collaborative workspace initiate by "loading" the same resource identifier. During the lifetime of the collaborative workspace, users' application instances may temporarily or even permanently "load" different resource identifiers. User interface affordances may be provided to enable users to re-sync their application instance to the original resource identifier.

Take the following example of a Google Docs™ editor application, which is a specialized web browser. On the shared workspace, the Google Docs app is configured to edit the shared document with resource ID https://docs.google.com/document/12345. The document might include a "link" to another Google Doc resource ID https://docs.google.com/document/abcdef, or another general web URL like https://www.ip1.nasa.gov/. In either case, the current disclosure can allow the Google Docs editor app to "follow" the link inline in the app view or load the linked URL within the same application view—in which case the application has diverged from the original Google Docs resource ID. Allowing these links to be traversed inline preferably enables the user to retrieve additional context on the original document while staying within the same view.

Alternatively, the embodiments may be configured to open clicked links in an external view—not inline within the Google Docs editor app. If we choose to load links in an external view—i.e., outside the shared workspace entirely—for example, in a browser tab other than the one currently in use—then, when the user has navigated away from the original Google Doc resource ID, an affordance can be included on the application view. Such an affordance may include a closure of the new browser tab, and a return to the browser tab that was associated with the original resource ID, https://docs.google.com/document12345.

In some embodiments, an application instance may be created in a "fully shared" mode, in which only one application instance is allocated and shared among any users who are not, by default, allocated their own application instances. The shared application instance may be associated with an anonymous user identity, with the identity of a user within the collaborative workspace, with a team/organization/and/or corporate identity, or some other suitable identity.

One embodiment of a "shared web browser app" could only operate in this fully-shared mode. In other embodiments, the current disclosure teaches using a URL whitelist to decide whether to create a full-shared app, or an app instance per user context.

A fully shared application instance may be "forked" into one application instance per user. Likewise, an application with per-use instances may be "un-forked" into a single, fully shared application instance.

Such an embodiment could be implemented on top of the supporting infrastructure that is already in place to support the features set forth above.

The following pseudo-code more comprehensively sets forth the embodiments described herein.

```
type Rect = {
  x: number
  y: number
  width: number
  height: number
}
type UserView = {
  cursor: Cursor
  rect: Rect
}
type User = {
  id: string
  name: string
  avatar: Image
  view: UserView
  following: User | null
}
type AppInstance ={
  id: string
  applicationId: string
  resourceId: string
  owner: User | null
  identity: Identity | null
  rect: Rect
}
type Canvas = {
  width: number
  height: number
  apps: AppInstance[ ]
}
type Room = {
  canvas: Canvas
  users: User[ ]
}
//---------------------------------------------------------------------------
// Code running on each user's local terminal
//
const me: User
const server = connect(backendURL)
server.subscribe(roomId, renderRoom)
fn renderApp(room: Room) {
  window.update(document.body, <Room room={room} />)
}
fn Room(room: Room) {
  const following = me.following
  const userView = following?following.view : me.view
  const canvas = room.canvas
  const apps = canvas.apps
  return (
    <Box viewBox={userView.rect} width={canvas.width}height={canvas.height}>
      <!-- Avatars, cursors, etc -->
      <UserPresence users={room.users} />
      <!-- Application views -->
      {
```

```
        apps.forEach(app =>
          (!app.owner || app.owner == following || (!following && app.owner == me)) ?
            <App app={app} /> :
            null
          )
        }
      </Box>
    )
  }
fn App(app: App) {
  // Manage connection to and rendering of App View
  //
  // Manage connection to App Control and forwarding of local events,
  // if control is permitted
}
```

Figure 16:
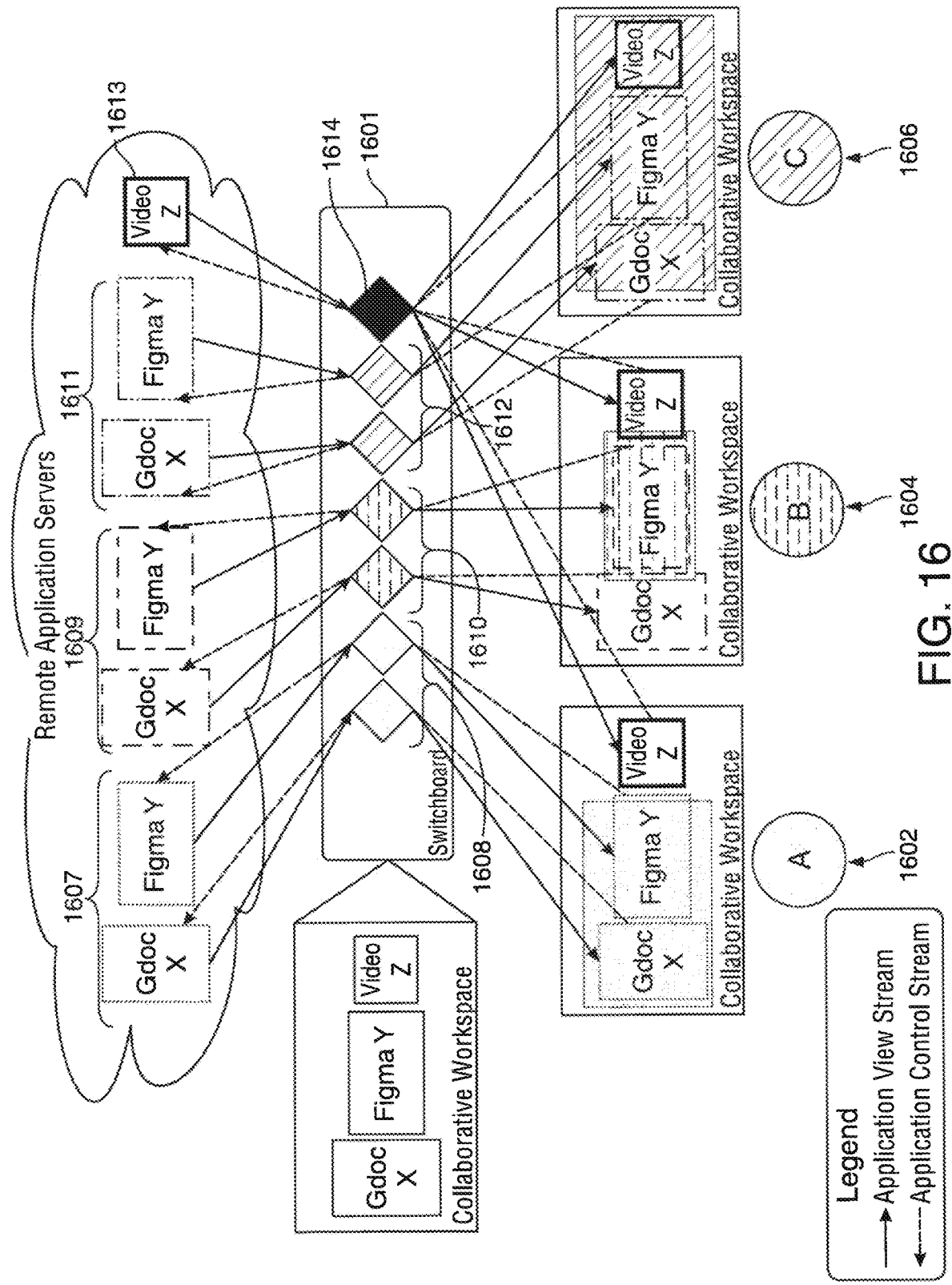
FIG. 16 shows another illustrative system diagram in accordance with principles of the disclosure.

FIG. 16 shows another illustrative system diagram in accordance with principles of the disclosure. More particularly, FIG. 16 shows an architecture for administering a collaborative workspace according to the disclosure. The collaborative workspace includes three private views. The collaborative workspace includes two exemplary "native multiplayer" apps (e.g., GDoc, Figma) and one shared "emulated multiplayer" app (e.g., Video.) All of the apps shown in FIG. 16 run in remote application servers.

FIG. 16 includes the following elements as part of the architecture. At 1601, FIG. 16 shows a schematic representation of collaborative workspace for use with application instances. First, second and third instances collaborative workspaces associated with a first, second and third private view, respectively, are shown at 1602, 1604 and 1606.

First, second and third server instances of two native multiplayer apps are shown at 1607, 1609 and 1611, respectively. First, second and third private views of the two native multiplayer apps are shown at 1608, 1610 and 1612, respectively.

A server instance for an emulated multiplayer app, whereby the emulation is performed using the methods and apparatus set forth herein, is shown at 1613. The emulated multiplayer app is shown as a shared instance of an app at 1614 appearing in the collaborative workspace, according to the embodiments set forth herein. For the purposes of the current disclosure, an emulated multiplayer app is preferably generated using the methods and/or apparatus set forth herein. The multiplayer app. should be understood to refer to an app that is constructed as a native single player app and then converted by the apparatus and methods set forth herein. The emulated multiplayer app. preferably provides functions such as, for example, follow and present.

Figure 17:
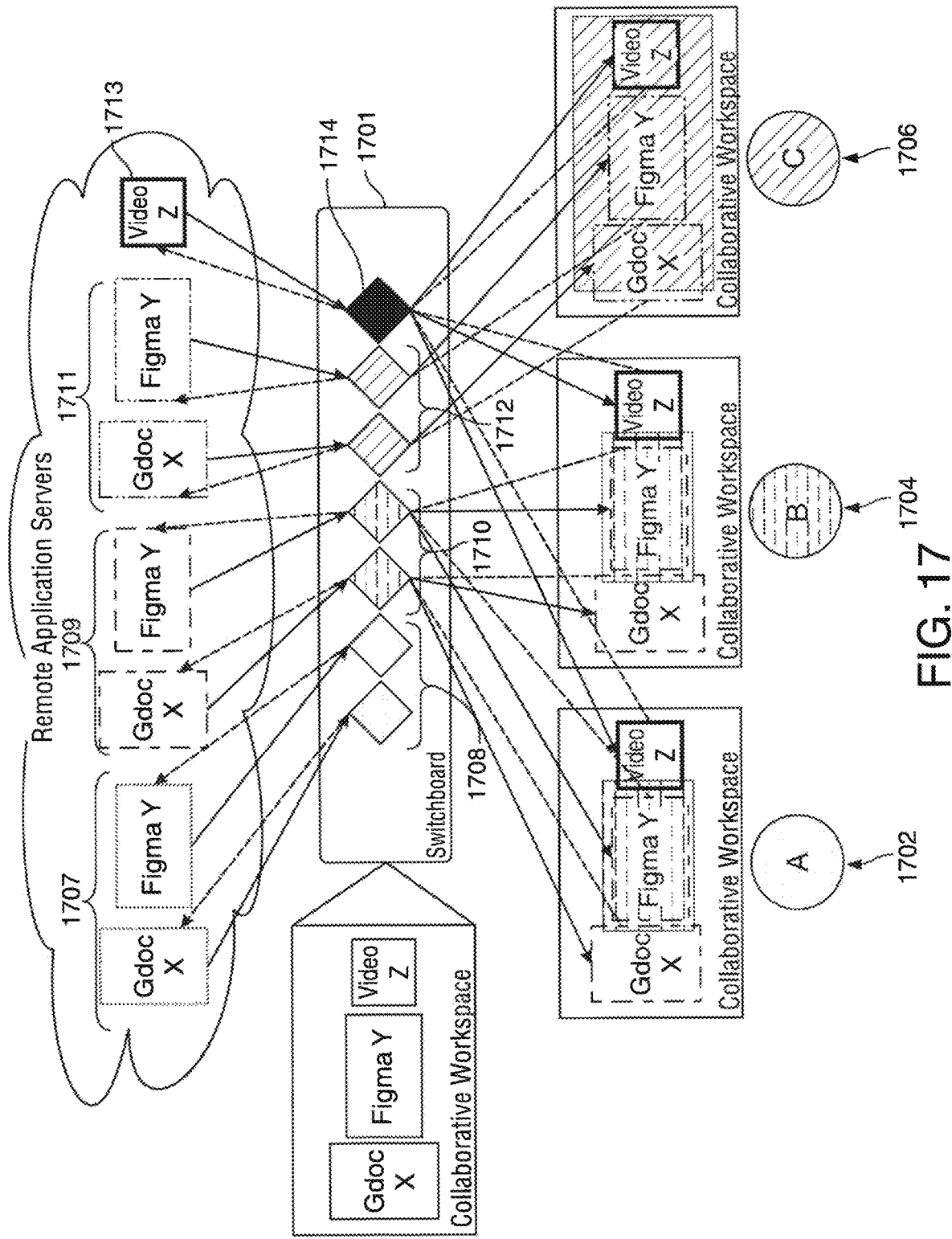
FIG. 17 shows yet another illustrative system diagram in accordance with the principles of the disclosure.

FIG. 17 shows yet another illustrative system diagram in accordance with the principles of the disclosure. FIG. 17 shows another architecture for administering a collaborative workspace according to the disclosure. In the workspace shown in FIG. 17, user A follows B, according to the disclosure. Thus, user A can see user B's view of B's app instances. User A can also see the shared app 1714. In preferred embodiments, user A can control user B's app instances. In other embodiments, user A can only view B's app instances. In yet other embodiments, user A can exhibit only partial control over B's app instances.

FIG. 17 includes the following elements as part of the architecture set forth therein. At 1701, a schematic representation of a collaborative workspace for use with app instances is shown.

At 1702, a first collaborative workspace view is shown. Specifically, workspace 1702 shows that user A follows user B and sees user B's view of B's multiplayer app instances. In addition, user A sees the shared app 1714. At 1704 and 1706, second and third collaborative workspace views are shown. First, second and third server instances of two native multiplayer apps are shown at 1707, 1709 and 1711, respectively.

At 1708, a first private view of two native multiplayer apps is shown. However, it should be noted that view 1708 is preferably subordinated, using follow technology, to view 1710. View 1710 shows a second private view of two native multiplayer apps. View 1712 shows a third private view of two native multiplayer apps.

A server instance for an emulated multiplayer app, whereby the emulation is performed using the methods and apparatus set forth herein, is shown at 1713. The emulated multiplayer app is shown as a shared instance of an app at 1714 appearing in the collaborative workspace, according to the embodiments set forth herein.

Figure 18:
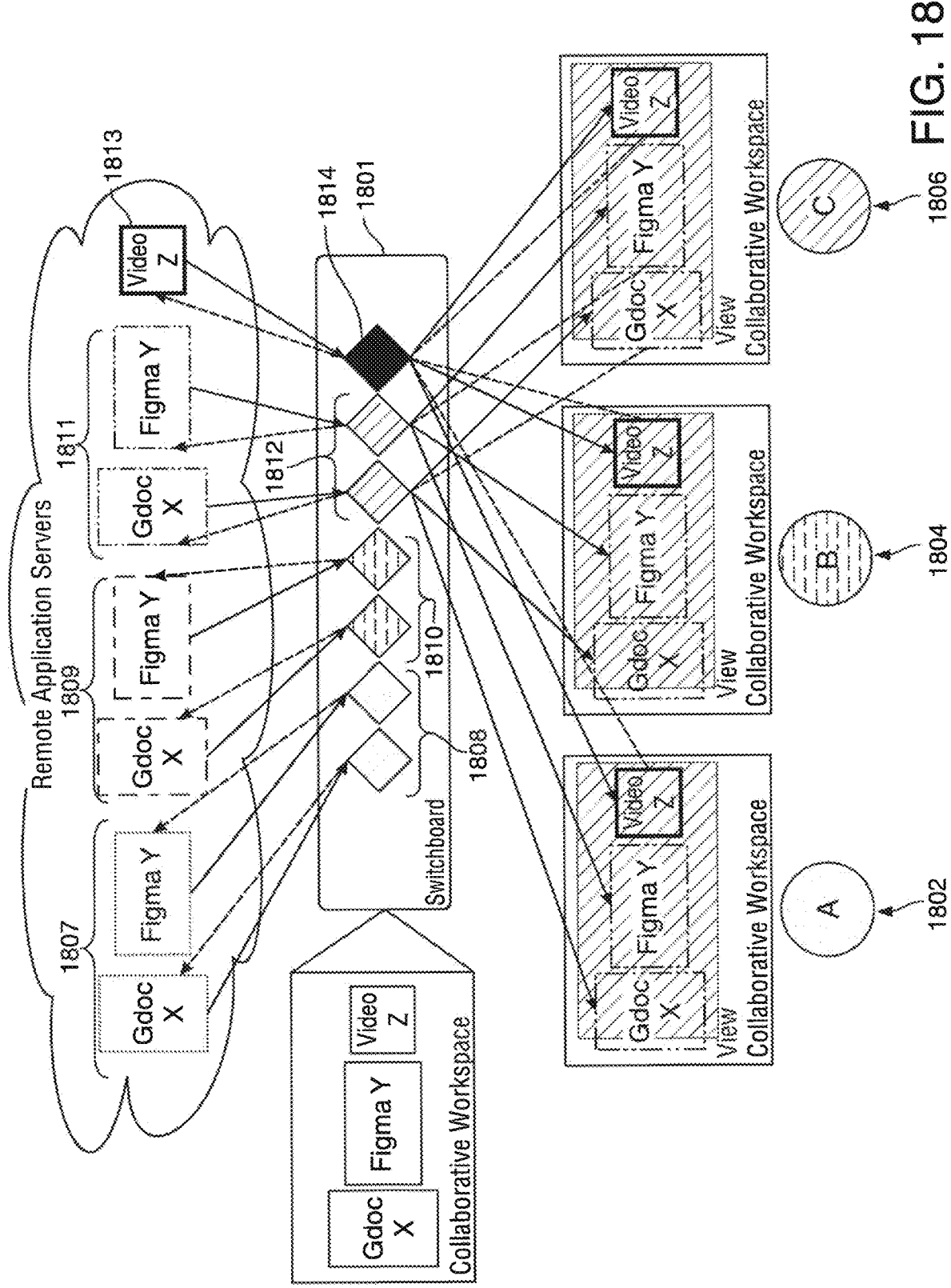
FIG. 18 shows still another illustrative system diagram in accordance with principles of the disclosure.

FIG. 18 shows still another illustrative system diagram in accordance with principles of the disclosure. FIG. 18 shows a workspace where a user C presents to preferably all other users. All users see user C's view of C's app instances, in addition to the shared app. Preferably only user C, however, can control C's app instances.

FIG. 18 includes the following elements as part of the architecture set forth therein. At 1801, a schematic representation of a collaborative workspace for use with app instances is shown.

First, second and third server instances of two native multiplayer apps are shown at 1807, 1809 and 1811, respectively. Elements 1802, 1804 and 1806 show views of the collaborative workspace as seen by user A, user B and user C, respectively. Elements 1808, 1810 and 1812 show the first, second and third private views of the server instances. It should be noted that, because user C is presenting, all of the users see user C's view of C's app instances (and A's and B's view of the app instances are subordinated to C's view of C's app instances), in addition to the shared app. While A's and B's view of the app instances are subordinated to C's view of C's app instances, nevertheless, A's and B's view of the app instances can, in certain embodiments, be opted-into by either A and/or B upon a selection by either A and/or B.

A server instance for an emulated multiplayer app (the shared app), whereby the emulation is performed using the methods and apparatus set forth herein, is shown at 1813. The emulated multiplayer app is shown as a shared instance of an app at 1814 appearing in the collaborative workspace, according to the embodiments set forth herein.

Figure 19:
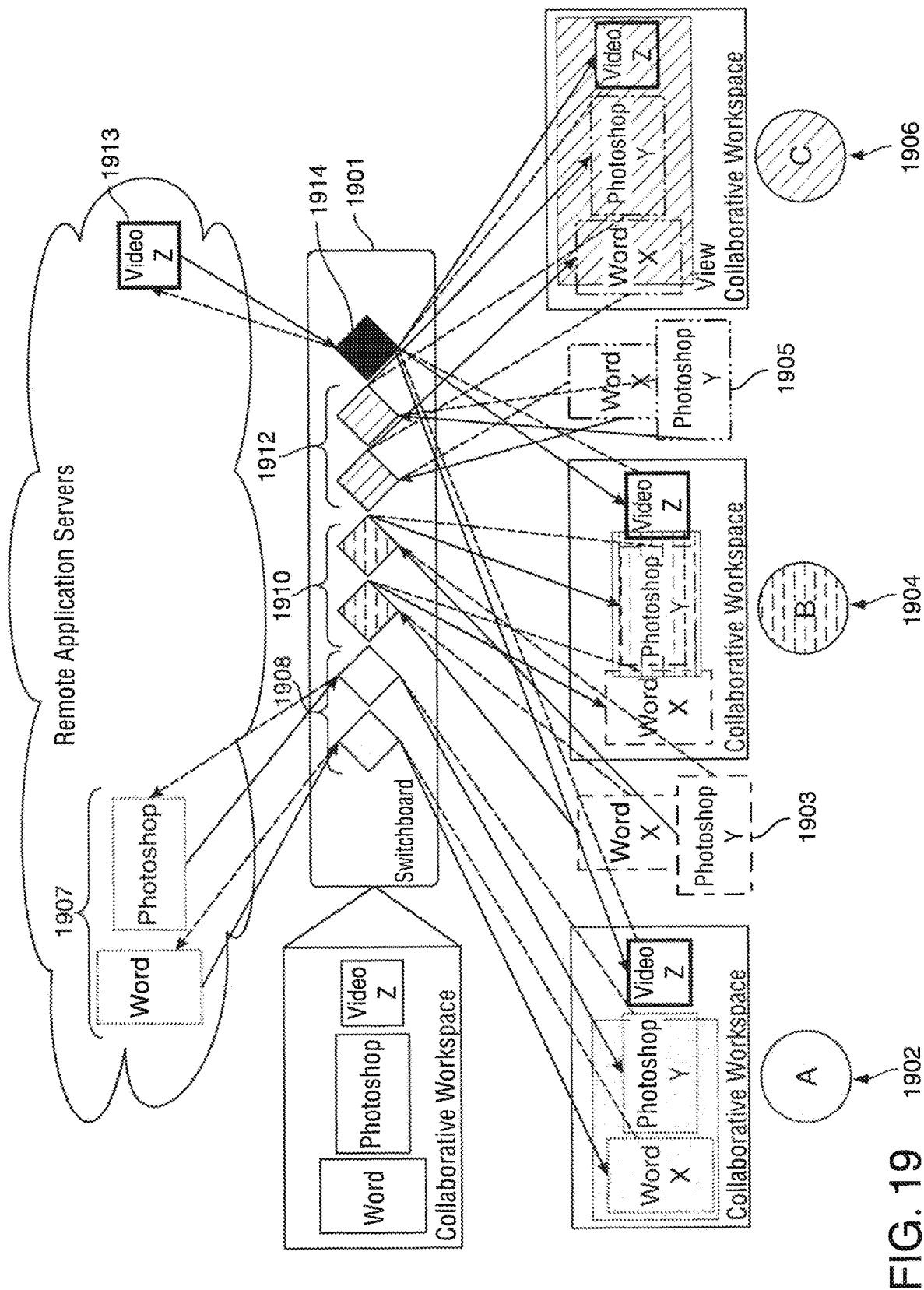
FIG. 19 shows another illustrative system diagram in accordance with principles of the disclosure.

FIG. 19 shows another illustrative system diagram in accordance with principles of the disclosure. FIG. 19 shows a collaborative workspace with three private views. The three private views include two native multiplayer apps (e.g., Word™, Photoshop™) and one shared app (e.g., Video). For users B and C, the two native multiplayer apps (Word and Photoshop) are running co-located with their terminals.

FIG. 19 includes the following elements as part of the architecture set forth therein. At 1901, a schematic representation of a collaborative workspace for use with app instances is shown.

A first, server-based, instance of two native multiplayer apps is shown at 1907. Two additional, co-located at the terminal, instances of the native multiplayer apps are shown at 1903 and 1905, respectively. First, second and third private views are shown 1902, 1904 and 1906.

At 1908, a first private view of the two native multiplayer apps is shown. At 1910 and 1912 second and third private views of the two native multiplayer apps are shown. It should be noted that both of the second and third private views 1910 and 1912 are running off of instances of the two native multiplayer apps that are co-located at the terminals of user B and user C, respectively.

A server instance for an emulated multiplayer app (the shared app), whereby the emulation is performed using the methods and apparatus set forth herein, is shown at 1913. The emulated multiplayer app is shown as a shared instance of an app at 1914 appearing in the collaborative workspace, according to the embodiments set forth herein.

Figure 20:
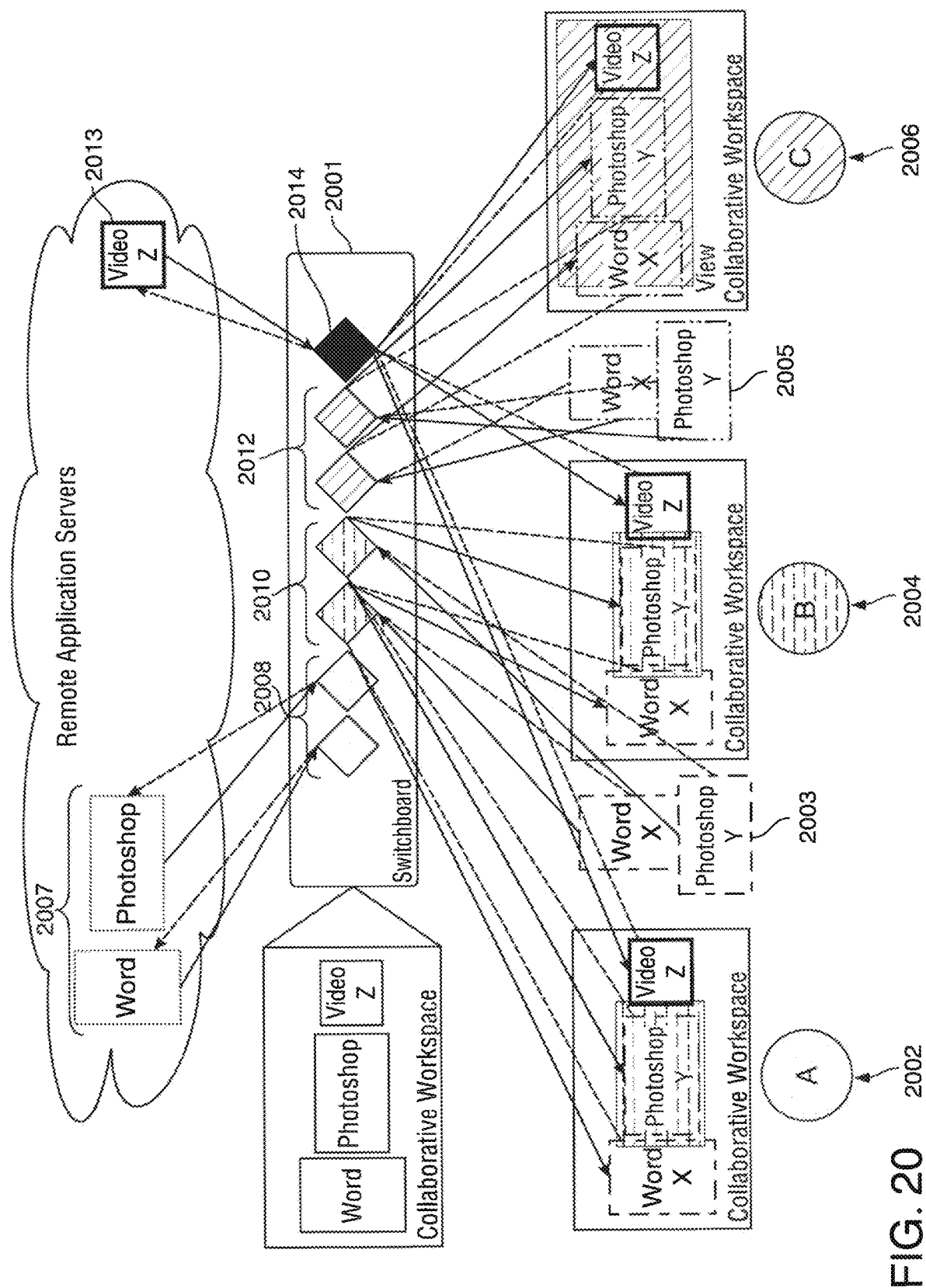
FIG. 20 shows yet another illustrative system diagram in accordance with principles of the disclosure.

FIG. 20 shows yet another illustrative system diagram in accordance with principles of the disclosure. In FIG. 20, user A follows B (even though B is running an instance of the native multiplayer apps from the co-located terminal) and can see user B's native multiplayer app instances, in addition to the shared app. User A can preferably control user B's app instances. User A preferably is not aware, and is not required to be aware, that user B's native multiplayer app instances are running co-located with B's terminal.

It should be noted that each of elements 2001, 2002, 2003, 2004, 2005, 2006, 2007, 2008, 2010, 2012, 2013 and 2014 are the same as the corresponding elements in FIG. 19, with the exception that, in FIG. 20 user A is configured to follow user B.

Figure 21:
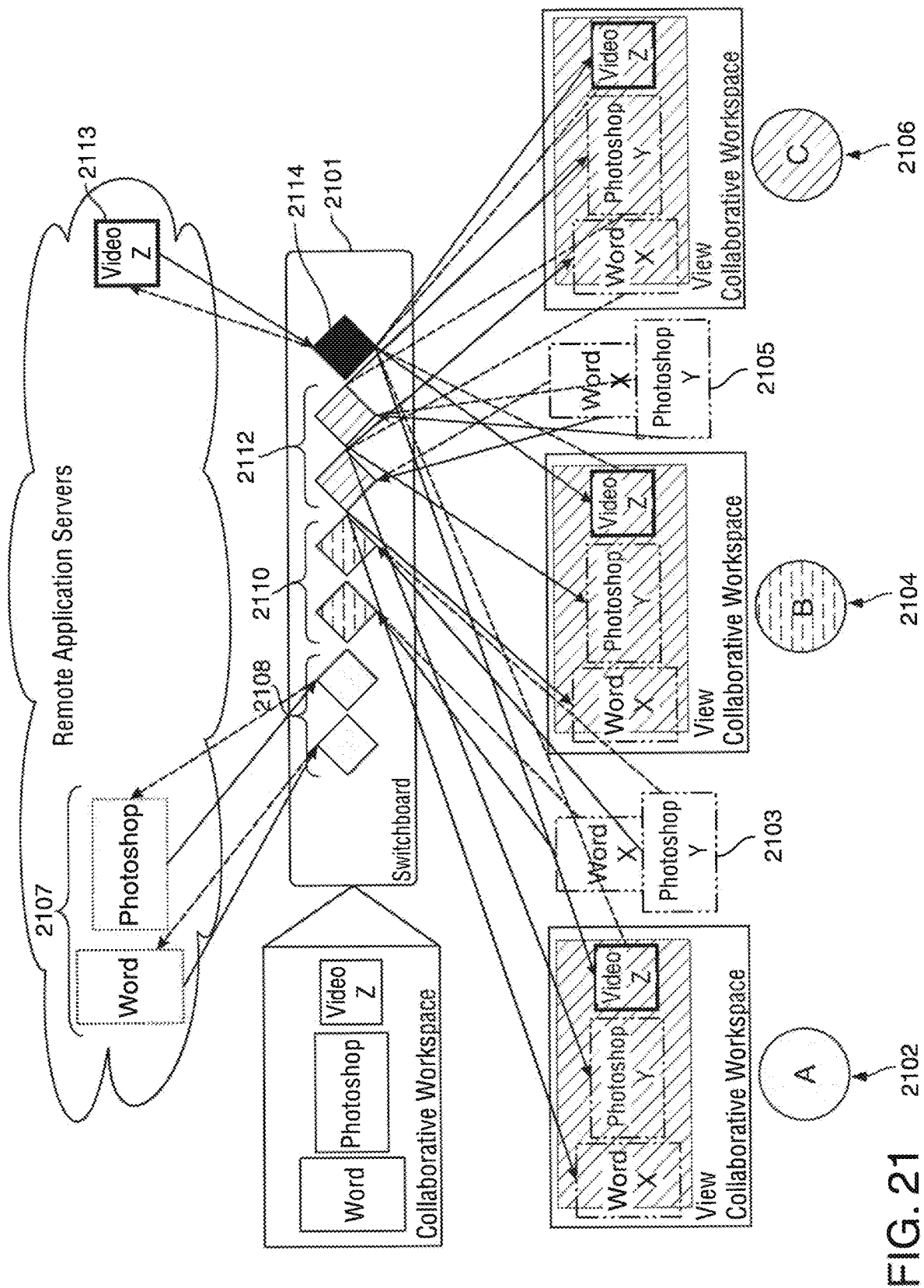
FIG. 21 shows still another illustrative system diagram in accordance with principles of the disclosure.

FIG. 21 shows still another illustrative system diagram in accordance with principles of the disclosure. In FIG. 21, user C presents to users A and B (even though user C is running an instance of the native multiplayer apps from the co-located terminal) and users A and B can see user C's native multiplayer app instances, in addition to the shared app. Users A and B, however, can preferably not control user C's app instances. Users A and B are preferably not aware, and are not required to be aware, that user C's native multiplayer app instances are running co-located with C's terminal.

It should be noted that the steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for collaborative remote interactive platforms are provided. Persons skilled in the art will appreciate that the present invention can be practiced by other than the described embodiments, which are presented for purposes of illustration rather than of limitation. The present invention is limited only by the claims that follow.

What is claimed is:

1. A shared web browser system, said system comprising computer executable code stored in a non-transitory memory that, when run on a processor, are configured to:
   render a coordinated digital workspace on each of a plurality of computer devices, wherein:
      each coordinated digital workspace is run on a digital application, said digital application being hosted on a remote server;
      the digital application is run on each of the coordinated digital workspaces by streaming the digital application from the remote server to each of the plurality of computing devices;
      an action performed within the digital application at a first coordinated digital workspace is propagated to each of the coordinated digital workspaces; and
      the first coordinated digital workspace includes a deliverable application control, the deliverable application control, when delivered to a second coordinated digital workspace, delivers application control of an application instance displayed in the first coordinated digital workspace, wherein the first coordinated digital workspace has a first layout, the first layout comprising a position of the application instance within the first coordinated digital workspace; and
   in response to receiving a command from the second coordinated digital workspace, trigger the delivery of the deliverable application control to the second coordinated digital workspace;
   wherein:
      upon receiving the deliverable application control at the second coordinated digital workspace:
         the second coordinated digital workspace displays the application instance,
         a control of the application instance is shared between the first coordinated digital workspace and the second coordinated digital workspace;

the second coordinated digital workspace has a second layout, the second layout comprising a position of the application instance within the second coordinated digital workspace, wherein the position of the application instance within the second coordinated digital workspace is identical to the position of the digital application within the first coordinated digital workspace; and the second layout comprises personalization characteristics different from the first layout.

2. The system of claim 1 wherein the deliverable application control is a limited application control.

3. The system of claim 1 wherein the deliverable application control is a full application control.

4. The system of claim 1 wherein the personalization characteristics include a customized view of a plurality of avatars.

5. The system of claim 1 wherein the personalization characteristics include a customized labeling of a plurality of cursors.

6. The system of claim 1, wherein said command comprises receiving, at the second digital workspace, a selection of an avatar associated with the first digital workspace.

7. The system of claim 1 wherein:
prior to receiving control of the first coordinated digital workspace, the second coordinated digital workspace is configured to control a second application instance; and
upon receiving control of the first coordinated digital workspace, the second coordinated digital workspace is configured to no longer control the second application instance.

8. A method for providing a shared web browser, the method executed via computer executable code stored in a non-transitory memory and run on a processor, the method comprising:
rendering a coordinated digital workspace on each of a plurality of computing devices, said rendering comprising:
running each coordinated digital workspace on a digital application;
hosting the digital application on a remote server;
running the digital application on each of the coordinated digital workspaces, wherein the running the digital application on each of the coordinated digital workspaces includes streaming the digital application from the remote server to each of the plurality of computing devices;
performing an action within the digital application at a first coordinated digital workspace;
propagating the action to each of the coordinated digital workspaces;

including in the first coordinated digital workspace a deliverable application control, said deliverable application control including control of an application instance displayed in the first coordinated digital workspace, wherein the application instance is displayed in the first coordinated digital workspace in a first layout, the first layout comprising a position of the application instance within the first coordinated digital workspace;
delivering the deliverable application control from the first coordinated digital workspace to a second coordinated digital workspace, said delivering being triggered in response to receiving a command from the second coordinated digital workspace; and
upon receiving application control of the application instance at the second coordinated digital workspace:
displaying the application instance in the second coordinated digital workspace in a second layout; and
sharing control of the application instance between the first coordinated digital workspace and the second coordinated digital workspace, wherein:
the second layout comprises a position of the application instance within the second coordinated digital workspace, wherein the position of the application instance within the second coordinated digital workspace is identical to the position of the digital application within the first coordinated digital workspace; and
the second layout comprises personalization characteristics different from the first.

9. The method of claim 8, wherein the deliverable application control is a limited application control.

10. The method of claim 8, wherein the deliverable application control is a full application control.

11. The method of claim 8, wherein the personalization characteristics include a customized view of a plurality of avatars.

12. The method of claim 8, wherein the personalization characteristics include a customized labeling of a plurality of cursors.

13. The method of claim 8, wherein said command comprises receiving, at the second digital workspace, a selection of an avatar associated with the first digital workspace.

14. The method of claim 8 further comprising:
the second coordinated digital workspace controlling a second application instance, prior to receiving control of the first coordinated digital workspace; and
upon receiving control of the first coordinated digital workspace, the second coordinated digital workspace no longer controlling the second application instance.

* * * * *